(12) United States Patent
Kaushal et al.

(10) Patent No.: US 11,290,482 B2
(45) Date of Patent: Mar. 29, 2022

(54) MOBILE APPLICATION NOTIFICATION SYSTEM FOR MONITORING SECURITY POSTURE AND RISK

(71) Applicant: Zscaler, Inc., San Jose, CA (US)

(72) Inventors: Jasbir Singh Kaushal, Sunnyvale, CA (US); Sichao Zhang, Roseville, CA (US); Varun Singh, Milpitas, CA (US); Muralidharan Manickam, San Jose, CA (US); Priyanka Pani, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 154 days.

(21) Appl. No.: 16/929,182

(22) Filed: Jul. 15, 2020

(65) Prior Publication Data

US 2021/0360016 A1    Nov. 18, 2021

Related U.S. Application Data

(63) Continuation of application No. 16/872,852, filed on May 12, 2020, now Pat. No. 11,089,047.

(51) Int. Cl.
*H04L 9/40* (2022.01)
*H04L 29/06* (2006.01)
(Continued)

(52) U.S. Cl.
CPC ........ *H04L 63/1433* (2013.01); *G06F 16/958* (2019.01); *H04L 63/1425* (2013.01);
(Continued)

(58) Field of Classification Search
CPC . H04L 63/1433; H04L 63/1425; H04L 67/26; H04L 67/2809; G06F 16/958; H04W 4/60; H04M 1/72406
See application file for complete search history.

(56) References Cited

U.S. PATENT DOCUMENTS 8,286,239 B1   10/2012  Sutton
8,429,111 B1    4/2013  Kailash et al.
(Continued)

FOREIGN PATENT DOCUMENTS

CN    106528078 A  *  3/2017  .......... G06F 9/4488
CN    106354832 B  *  9/2020  .......... G06F 16/958

*Primary Examiner* — Benjamin M Thieu
(74) *Attorney, Agent, or Firm* — Clements Bernard Baratta; Lawrence A. Baratta, Jr.

(57) ABSTRACT

A mobile application notification system that includes a cloud node including a subscription service and a publication service, each executed on the cloud node, wherein the subscription service is configured to manage a plurality of users associated with a tenant of multiple tenants, each of the plurality of users have a corresponding user device that executes a monitoring application thereon, wherein management via the subscription service includes subscribing each of the plurality of users and configuring the tenant and associated messages, and wherein the publication service is configured to communicate with the corresponding user device of the plurality of users and to communication to a plurality of publisher threads, for exchanging messages therebetween, based on the subscribing and the configuring, and wherein at least two corresponding user device of the plurality of users utilize a different operating system and platform from one another.

20 Claims, 49 Drawing Sheets

(51) Int. Cl.
*G06F 16/958* (2019.01)
*H04L 67/55* (2022.01)
*H04W 4/60* (2018.01)
*H04L 67/562* (2022.01)
*H04M 1/72406* (2021.01)

(52) U.S. Cl.
CPC .......... *H04L 67/26* (2013.01); *H04L 67/2809* (2013.01); *H04M 1/72406* (2021.01); *H04W 4/60* (2018.02)

(56) References Cited

U.S. PATENT DOCUMENTS

| | | |
|---|---|---|
| 8,478,708 B1 | 7/2013 | Larcom |
| 8,484,726 B1 | 7/2013 | Sutton |
| 9,118,689 B1 | 8/2015 | Apte et al. |
| 10,142,362 B2 | 11/2018 | Weith et al. |
| 10,225,740 B2 | 3/2019 | Bansal et al. |
| 10,523,710 B2 | 12/2019 | Sinha et al. |
| 2013/0339514 A1 | 12/2013 | Crank et al. |

\* cited by examiner

FIG. 14

MOBILE APPLICATION NOTIFICATION SYSTEM FOR MONITORING SECURITY POSTURE AND RISK

CROSS-REFERENCE TO RELATED APPLICATION(S)

The present disclosure is a continuation-in-part of U.S. patent application Ser. No. 16/872,852, filed May 12, 2020, and entitled "Systems and methods for monitoring and displaying security posture and risk," the contents of which are incorporated by reference herein in their entirety.

FIELD OF THE DISCLOSURE

The present disclosure generally relates to computer networking systems and methods. More particularly, the present disclosure relates to systems and methods for monitoring and displaying security posture and risk and for a mobile application notification system for monitoring security posture and risk.

BACKGROUND OF THE DISCLOSURE

The enterprise Information Technology (IT) is evolving from defending networks with secured perimeters to having users remote, using mobile devices, etc. With this evolution, IT administrators have to monitor users and their mobile devices regardless of their location, network access, etc. Remote users (employees, contractors, partners, etc.) are accessing corporate data, cloud applications, and internal enterprise applications from anywhere, anytime. Mobile devices connect to the Internet through wireless networks such as Wi-Fi hotspots or cellular data networks, and the like. Of note, these mobile devices themselves and the network access techniques are outside the control of IT. Also, on mobile devices, the line between enterprise and personal usage is blurred. Since the enterprise typically does not own the device, enforcing policies for acceptable usage or installing application controls as a traditional IT administrator would on a corporate device, is not viable for a Bring Your Own Device (BYOD) scenario. To address such limitations, enterprise IT is moving their security to the cloud, such as via a cloud-based security system.

The security environment is complex and evolving. It would be advantageous, in terms of such cloud-based security systems, to give IT a view of its users in a seamless and meaningful manner.

BRIEF SUMMARY OF THE DISCLOSURE

The present disclosure relates to systems and methods for monitoring and displaying security posture and risk. Specifically, the present disclosure includes a software application that is configured to monitor and develop insights from a cloud-based system that can provide cloud-based security, Zero Trust Network Access (ZTNA), digital Quality of Experience (QoE) monitoring, and the like, in a multi-tenant environment. As such, the software application can provide enterprise IT with a view of its users as well as insights based on all users, in a centralized manner, along with recommendations for best practices and the like. Examples of insights include cloud application usage and trends grouped by users, e.g., productivity applications, collaboration applications, file sharing applications, streaming applications, social media applications, etc. Other insights can include risk-related information such as a composite risk score, visualizations of threat activity (advanced threats, antivirus, sandbox, etc.), high-risk users, threat distribution, etc. Also, IT can use the application to understand usage (bandwidth, application, etc.) by location, department, etc.

Systems and methods include obtaining log data from a storage cluster associated with a cloud-based security system, wherein the log data includes transaction data associated with a plurality of users of the cloud-based security system, wherein the transaction data is for one or more of cloud security service transactions, application access via a Zero Trust Network Access (ZTNA) service, and user experience metrics, and wherein the cloud-based security system includes a plurality of tenants with the plurality of users each assigned thereto; analyzing the log data to determine a plurality of visualizations of the transaction data for a tenant; providing a User Interface (UI) to a mobile application with the plurality of visualizations; and providing a risk score summarizing an overall risk posture of the tenant in a single metric.

A mobile application notification system includes a cloud node including a subscription service and a publication service, each executed on the cloud node, wherein the subscription service is configured to manage a plurality of users associated with a tenant of multiple tenants, each of the plurality of users have a corresponding user device that executes a monitoring application thereon, wherein management via the subscription service includes subscribing each of the plurality of users and configuring the tenant and associated messages, and wherein the publication service is configured to communicate with the corresponding user device of the plurality of users and to communication to a plurality of publisher threads, for exchanging messages therebetween, based on the subscribing and the configuring, and wherein at least two corresponding user device of the plurality of users utilize a different operating system and platform from one another.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

FIGS. 10-49 are various User Interface (UI) screens associated with the application on the user device, with the data provided by the application based on the monitoring data in the storage cluster;

DETAILED DESCRIPTION OF THE DISCLOSURE

Again, the present disclosure relates to systems and methods for monitoring and displaying security posture and risk. Specifically, the present disclosure includes a software application that is configured to monitor and develop insights from a cloud-based system that can provide cloud-based security, Zero Trust Network Access (ZTNA), digital Quality of Experience (QoE) monitoring, and the like, in a multi-tenant environment. As such, the software application can provide enterprise IT with a view of its users as well as insights based on all users, in a centralized manner, along with recommendations for best practices and the like. Examples of insights include cloud application usage and trends grouped by users, e.g., productivity applications, collaboration applications, file sharing applications, streaming applications, social media applications, etc. Other insights can include risk-related information such as a composite risk score, visualizations of threat activity (advanced threats, antivirus, sandbox, etc.), high-risk users, threat distribution, etc. Also, IT can use the application to understand usage (bandwidth, application, etc.) by location, department, etc.

Example Cloud-Based System Architecture

Figure 1:
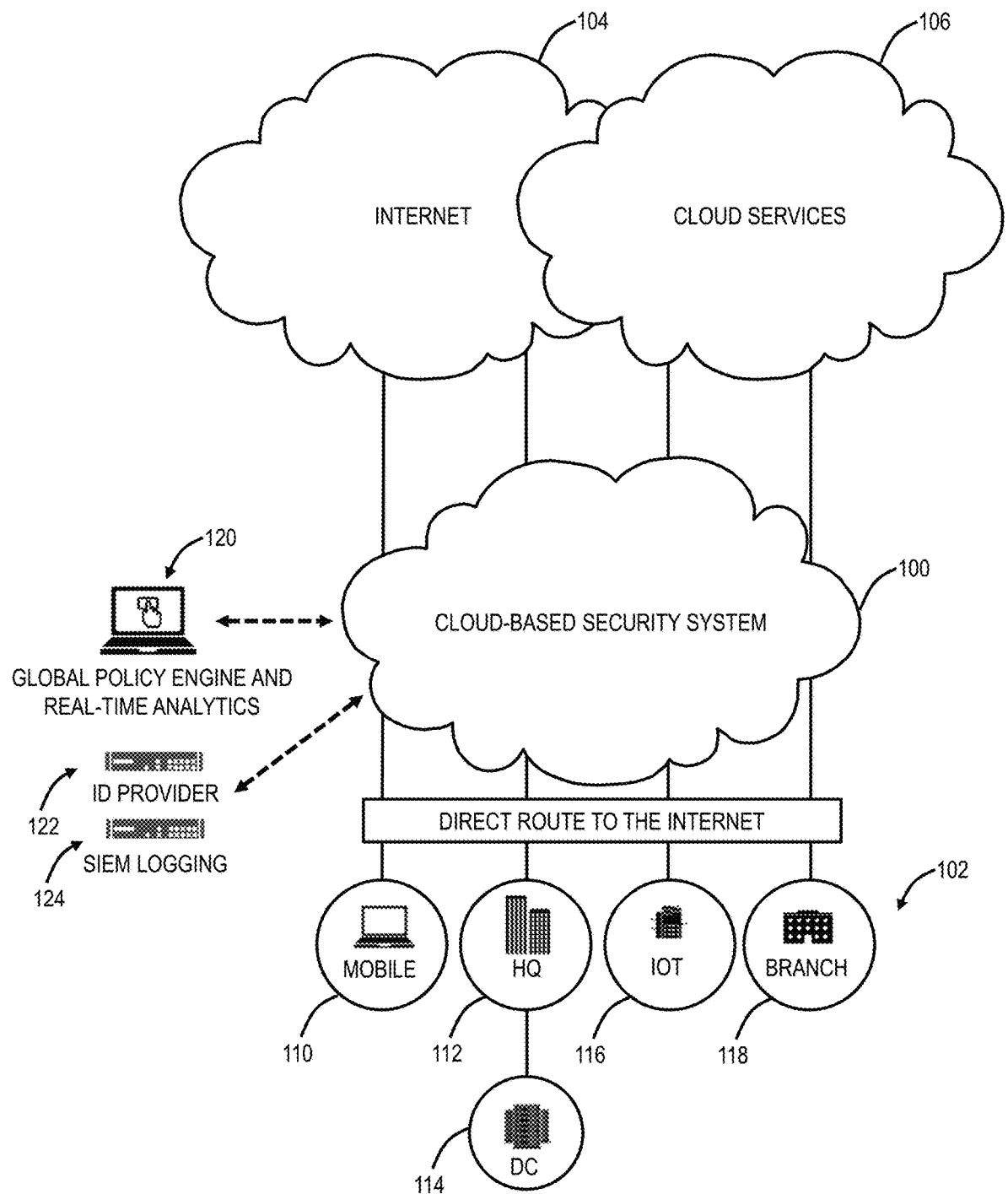
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. The DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
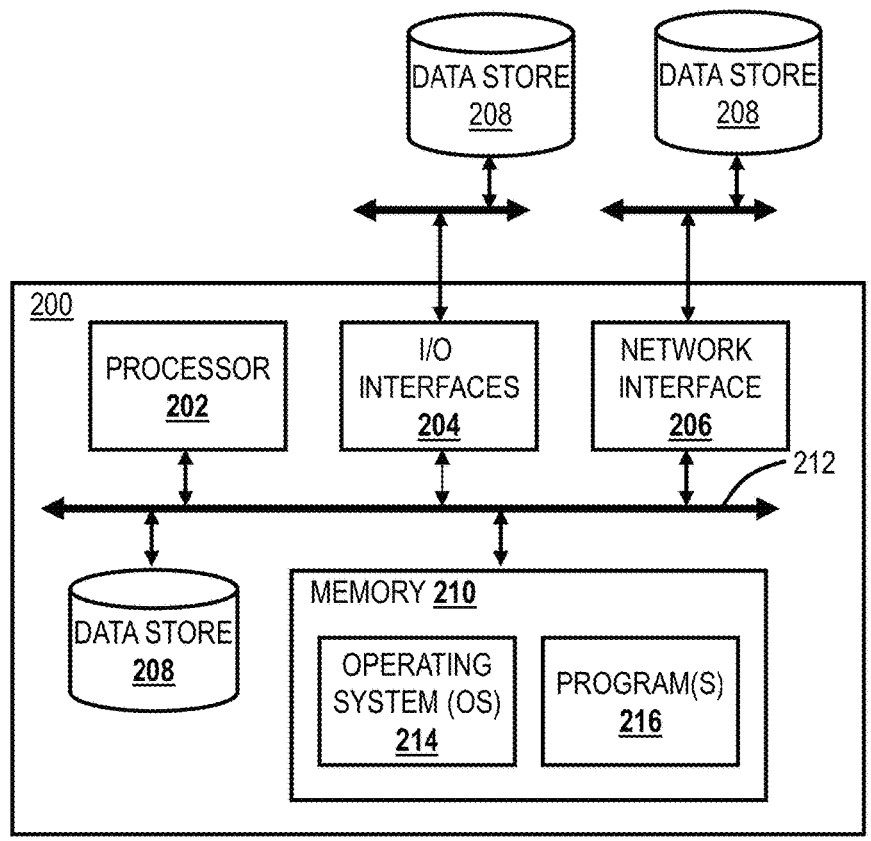

For illustration purposes, the users 102 of the cloud-based system 100 can include a mobile device 110, a headquarters (HQ) 112 which can include or connect to a data center (DC) 114, Internet of Things (IoT) devices 116, a branch office 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
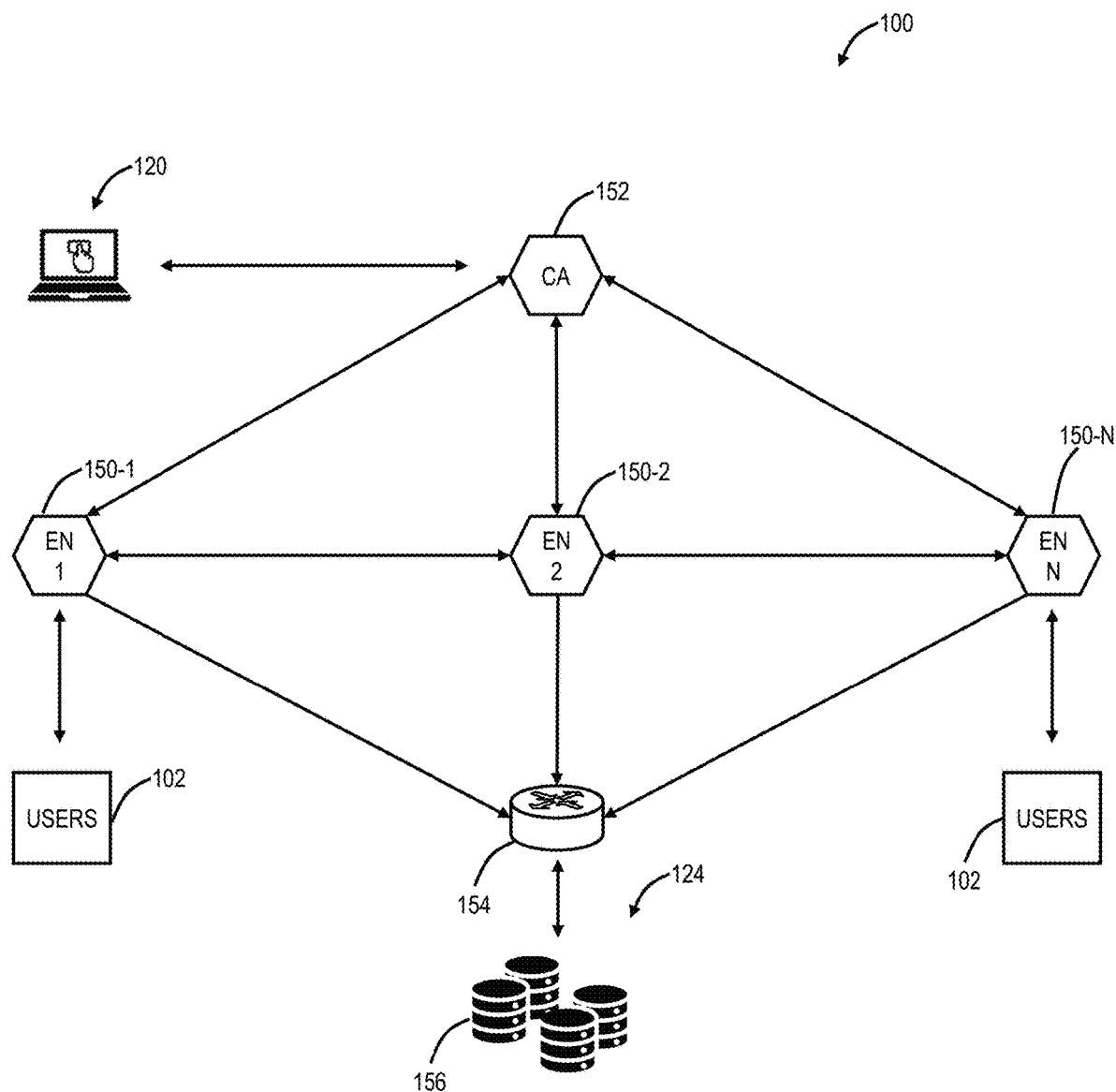
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured to never store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 in order to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources in lieu of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
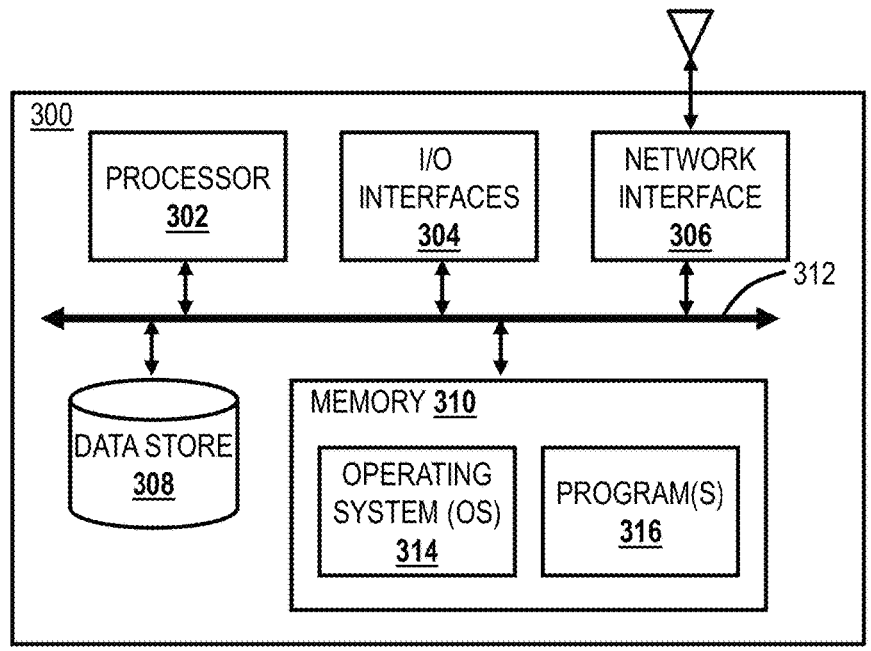

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
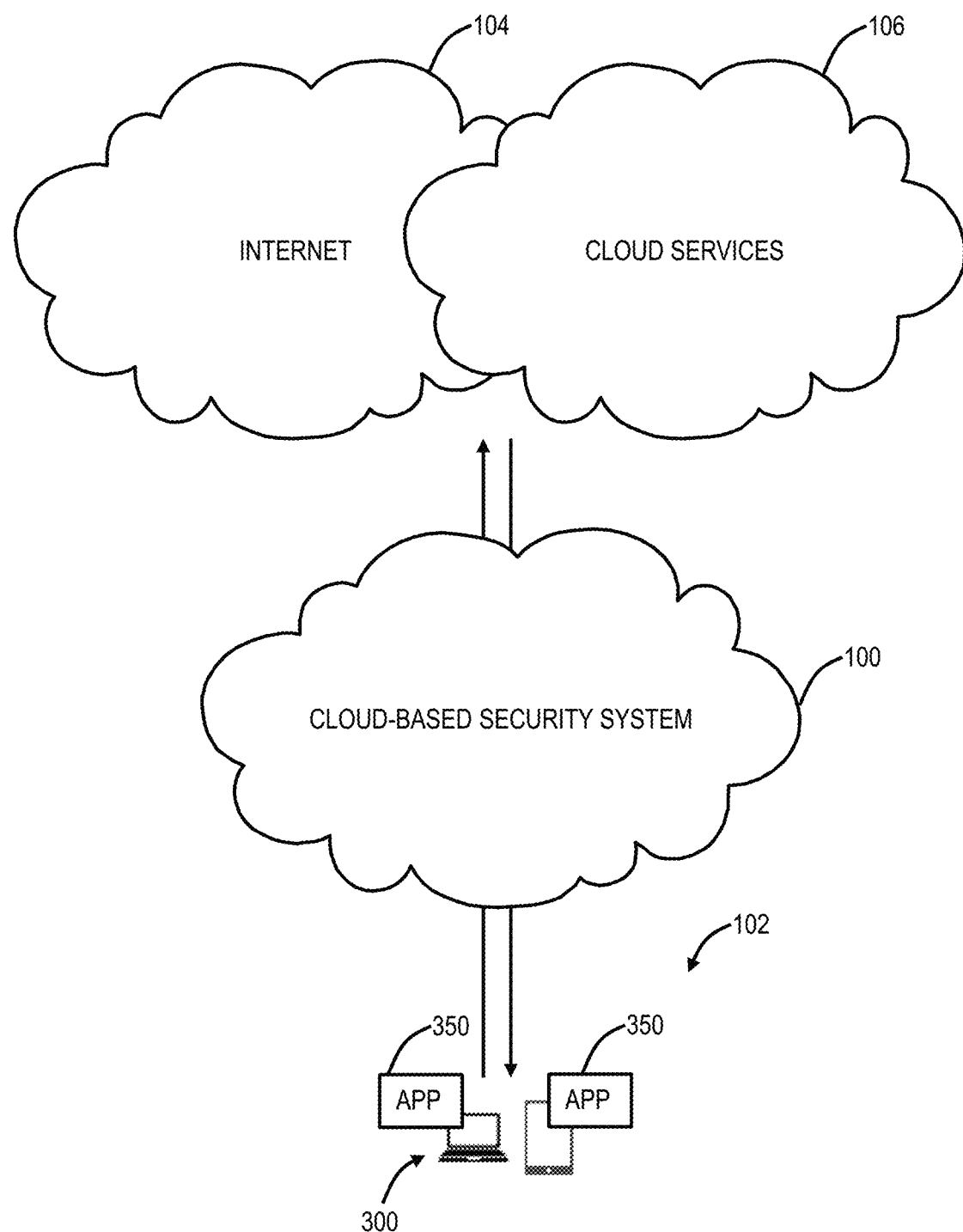
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to seamlessly deploy and manage the user devices 300. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Zero Trust Network Access Using the Cloud-Based System

Figure 6:
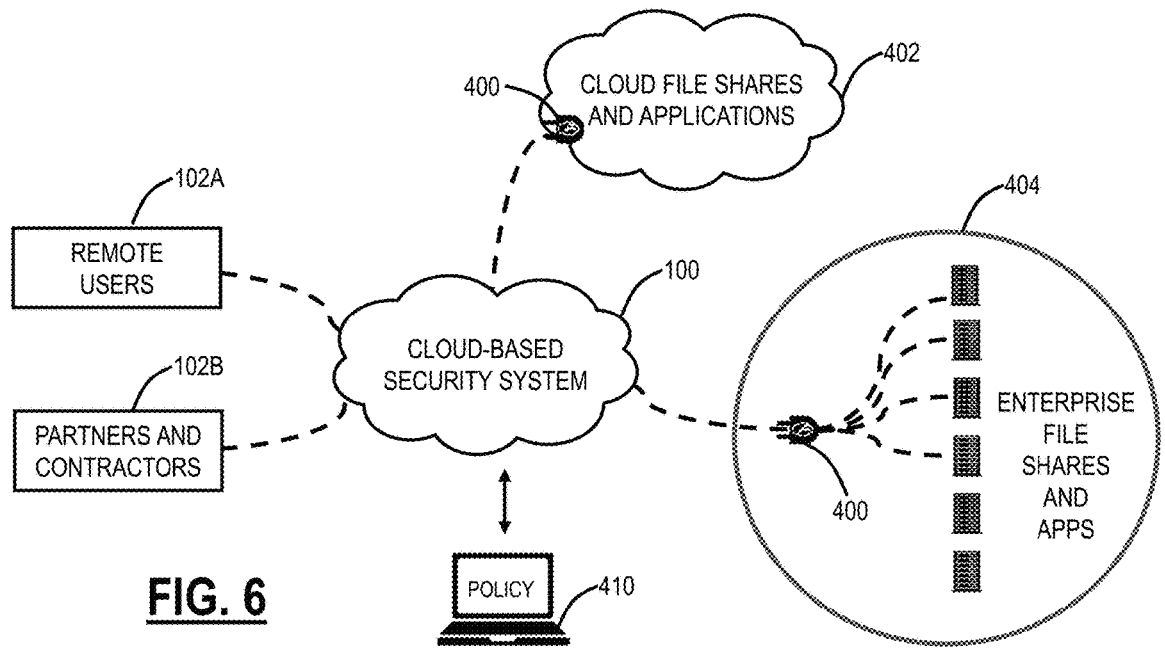
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 404, connected to enterprise file shares and applications. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy 410, and the cloud-based system 100 to stitch the applications 402, 404 and the software connectors 400 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end-users and enterprises. FIG. 5 can include the ZPA service from Zscaler, Inc.

Digital Experience Monitoring

Figure 7:
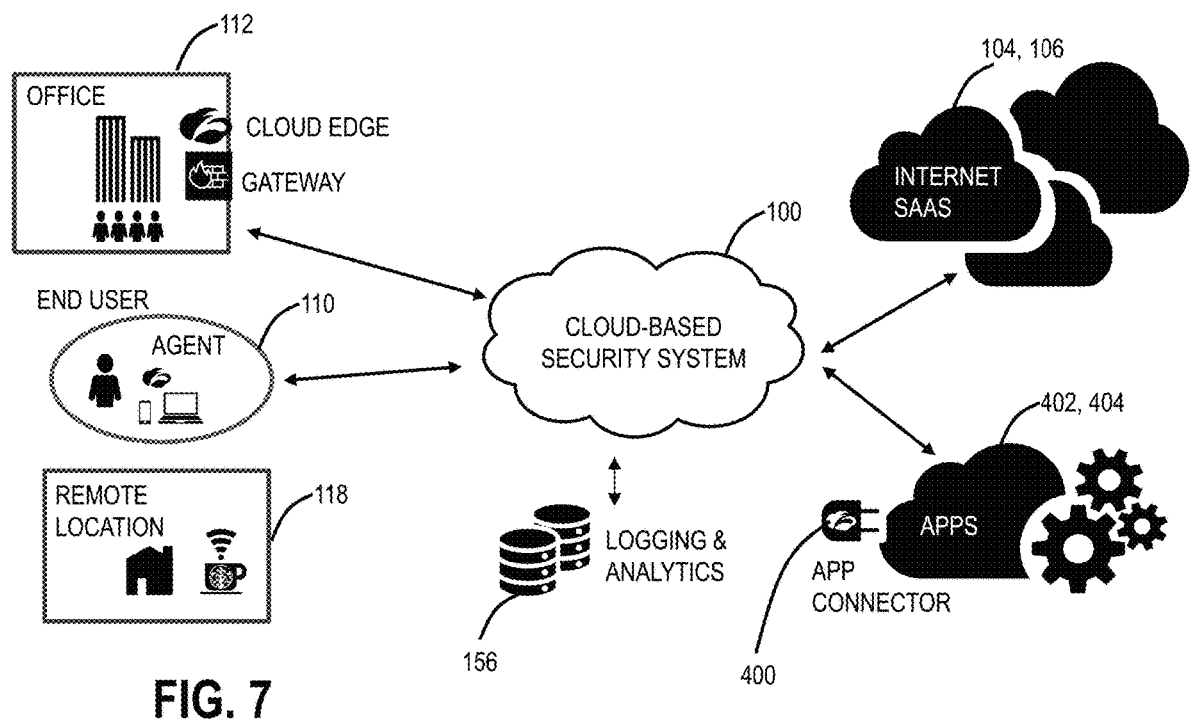
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service, as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end-user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |

-continued

| | |
|---|---|
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Monitoring Application

Figure 8:
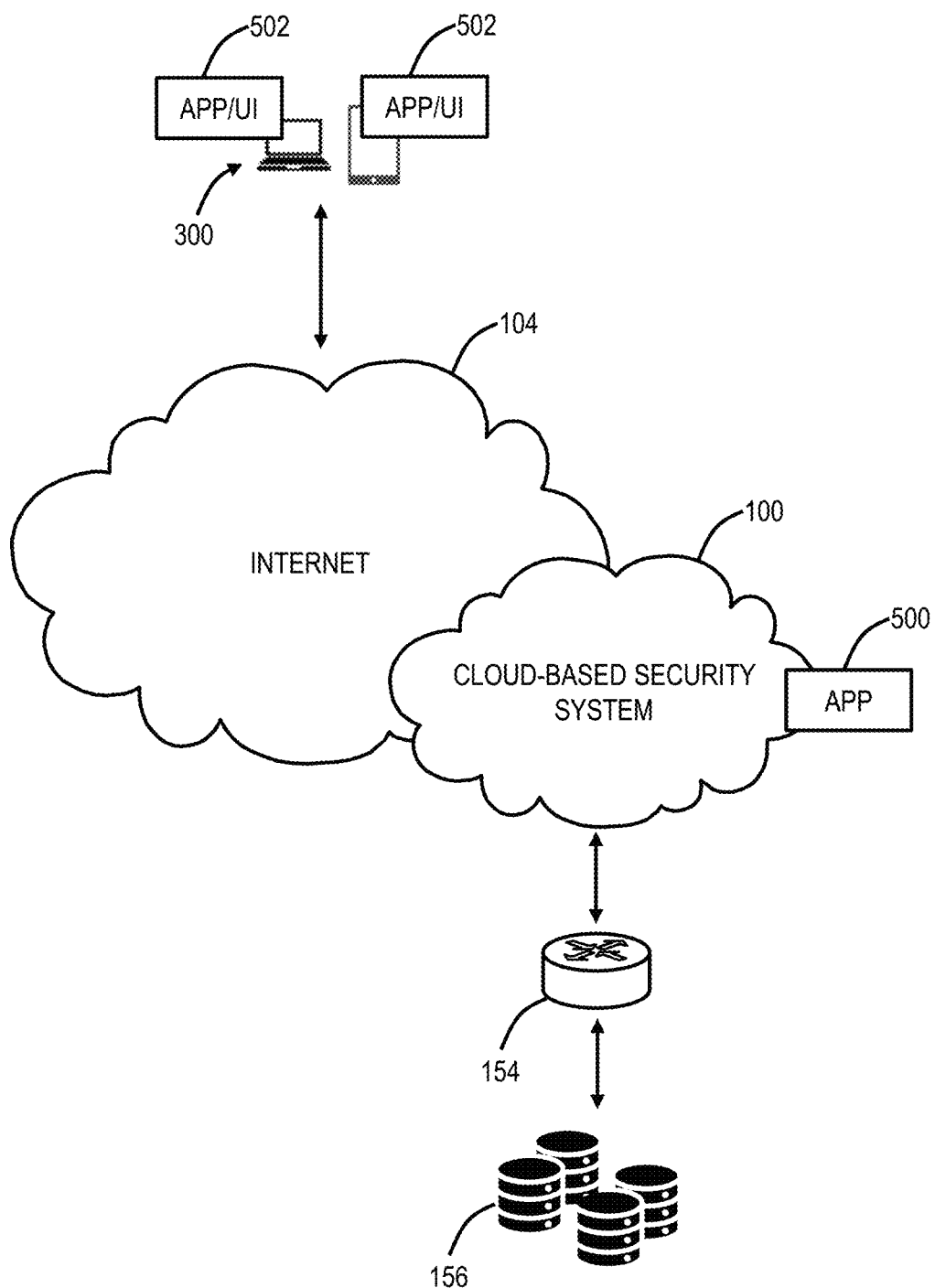
FIG. 8 is a network diagram illustrating a use case of a monitoring application with the cloud-based security system.

FIG. 8 is a network diagram illustrating a use case of a monitoring application 500 with the cloud-based security system 100. Specifically, the monitoring application 500 can be hosted in the cloud, such as in the cloud-based security system 100, the management system 120, on an enforcement node 150, on a server 200, etc. The monitoring application 500 is also communicatively coupled to one or more user applications/UIs 502 that are on corresponding user devices 300, for displaying various visualizations described herein. As described herein, the cloud-based security system 100 is configured to log data based on the operation to the storage cluster 156, such as via the log router 154. The monitoring application 500 is configured to analyze and present visualizations of this data from the storage cluster 156 to the user applications/UIs 502.

The storage cluster 156 stores transaction logs and provide reports, via the monitoring application 500. Every second or another time interval, the storage cluster 156 receives logs from all over the world, from the enforcement nodes 150, correlates them to a specific customer organization, and writes them to disk for high-speed retrieval of reporting and analytics. For example, the storage cluster 156 can process tens of billions of logs or more per day.

This unique and intuitive mobile application 502 simplifies complex networking and security concepts through effective visual storytelling, as well as a clean user interface that respects the guidelines of the mobile platforms the application is available on (iOS, iPadOS, Android). In a matter of seconds, executives can find out whether their organization is well protected, find out the latest news stories from the security industry, and even share any suspicious activity they see in the app with their coworkers. The application highlights the benefits of the cloud-based security system 100, from public Internet protection in the form of Zscaler Internet Access to Zero Trust Network Access and Software Defined Perimeter in the form of Zscaler Private Access.

Figure 9:
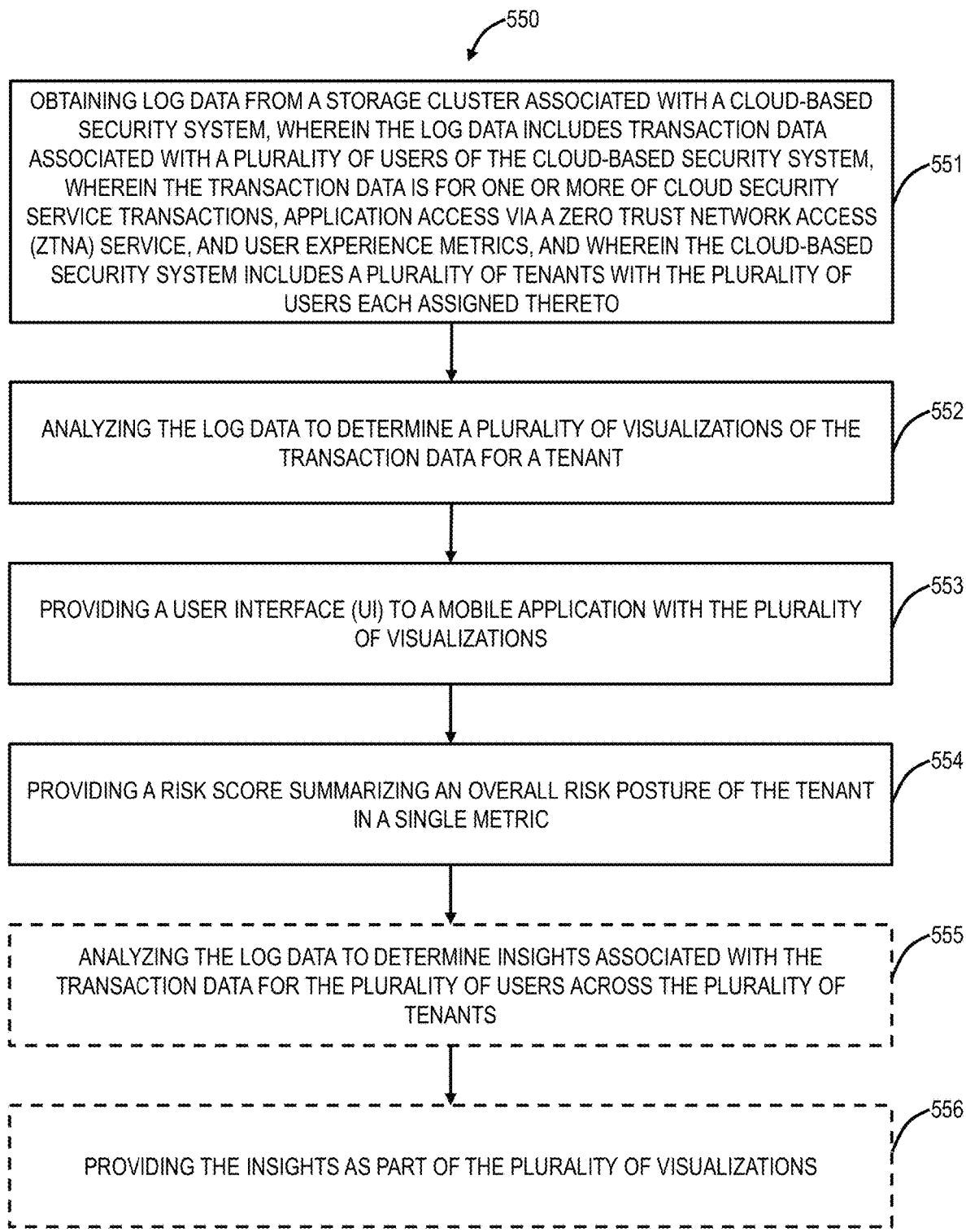
FIG. 9 is a flowchart of a process for monitoring and displaying security posture and risk, utilizing the cloud-based security system, the monitoring application, and the user applications/UIs.
Figure 10:
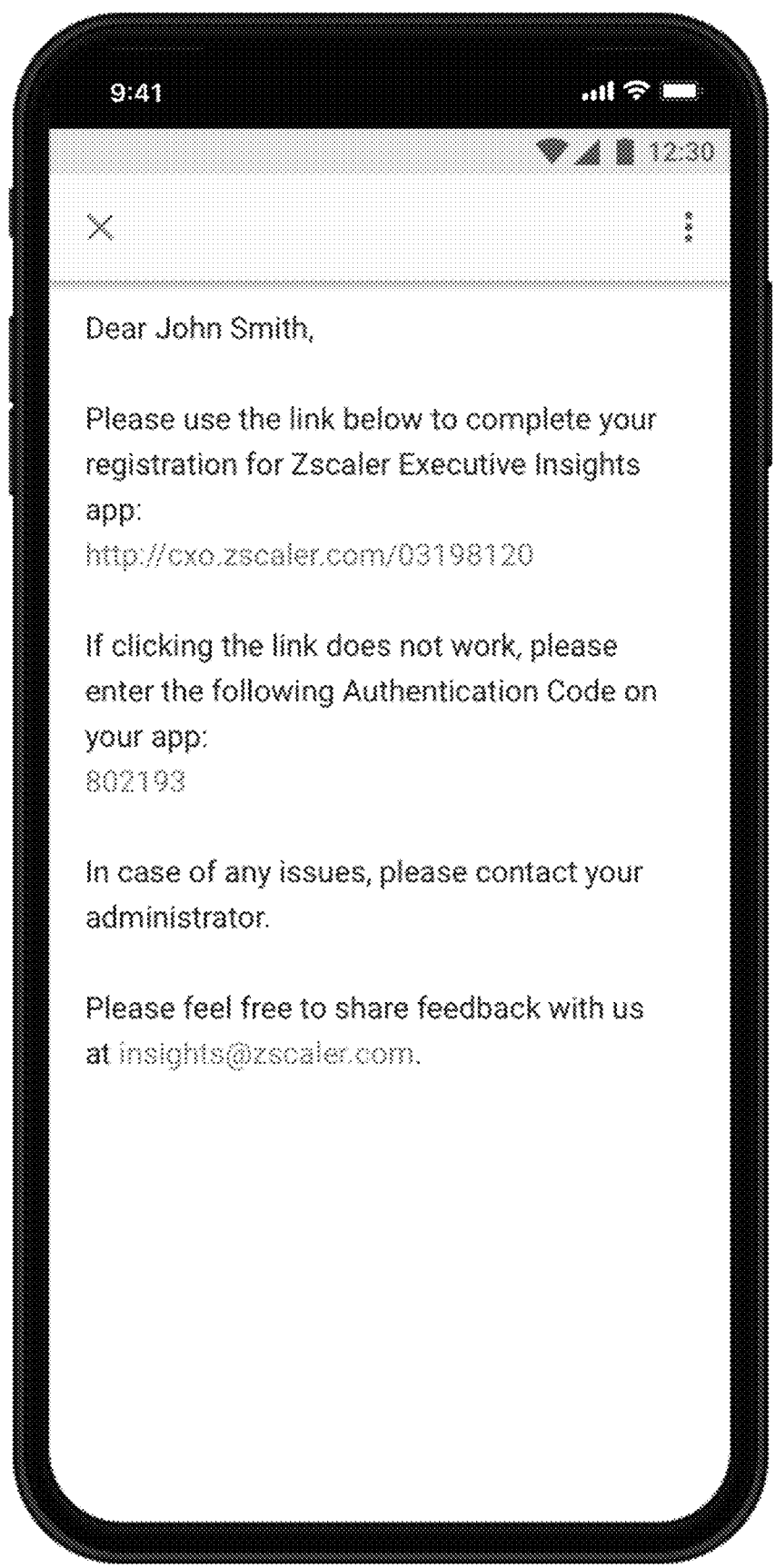

FIG. 9 is a flowchart of a process 550 for monitoring and displaying security posture and risk, utilizing the cloud-based security system 100, the monitoring application 500, and the user applications/UIs 502. Specifically, the process 550 is described from the perspective of the monitoring application 500, which can be a cloud-based application that obtains data from the storage cluster 156, analyzes the data, and presents visualizations to an end user 102 via the user applications/UIs 502.

Variously, the monitoring application 500 provides insightful data from a cloud security service, from a ZTNA service, and a UX service, all implemented via the cloud-based security system 100. This is provided for a tenant, with granularity as well as across tenants, i.e., multi-tenant insights. As described herein, insights are meaningful data presented for easy understanding and visualization, such as via a CISO/CTO/CIO. The user applications/UIs 502 can be applications, such as mobile applications for iOS, iPadOS, Android, Windows, etc.

The process 550 includes obtaining log data from a storage cluster associated with a cloud-based security system, wherein the log data includes transaction data associated with a plurality of users of the cloud-based security system, wherein the transaction data is for one or more of cloud security service transactions, application access via a Zero Trust Network Access (ZTNA) service, and user experience metrics, and wherein the cloud-based security system includes a plurality of tenants with the plurality of users each assigned thereto (step 551); analyzing the log data to determine a plurality of visualizations of the transaction data for a tenant (step 552); providing a User Interface (UI) to a mobile application with the plurality of visualizations (step 553); and providing a risk score summarizing an overall risk posture of the tenant in a single metric (step 554). The process 550 can further include analyzing the log data to determine insights associated with the transaction data for the plurality of users across the plurality of tenants (step 555); and providing the insights as part of the plurality of visualizations (step 556).

The plurality of visualizations can be provided in a tile format to the mobile application. The process 550 can further include registering a user of the tenant for the mobile application and for Single Sign On (SSO). The plurality of visualizations can include a summary of the risk score over time and activities contributing to the risk score. The plurality of visualizations can include a graph of traffic trends including encrypted and unencrypted traffic. The plurality of visualizations can include a graph bandwidth by locations of the tenant. The plurality of visualizations can include a graph of cloud application usage and a chart of top applications for the tenant. The plurality of visualizations can include a graph of usage based on social applications, Office 365 applications, streaming applications, file sharing applications, collaboration applications, and productivity applications. The applications can further include graphs of different applications therein.

The plurality of visualizations can include, for the cloud security service transactions, a list of transaction processed, threats blocked, total bandwidth, number of users, and number of locations. The plurality of visualizations can include a chart of threat distribution. The plurality of visualizations can include a chart of malicious content trends, phishing trends, botnets, sandboxed threats blocked, advanced threats blocked, browser exploits, and Cross-Site Scripting. The plurality of visualizations can include, for the ZTNA service, a visualization of application usage, locations, and bandwidth trends. The plurality of visualizations can include data related to an operational status of the cloud-based security system.

User Interface Screens

FIGS. 10-49 are various User Interface (UI) screens associated with the application 502 on the user device 300, with the data provided by the application 500 based on the monitoring data in the storage cluster 156. These screens are shown from the perspective of the application 502, but those of ordinary skill in the art will recognize the underlying data is processed and analyzed by the monitoring application 500 from the monitoring data in the storage cluster 156.

Registration and Single Sign-On (SSO)

Figure 11:
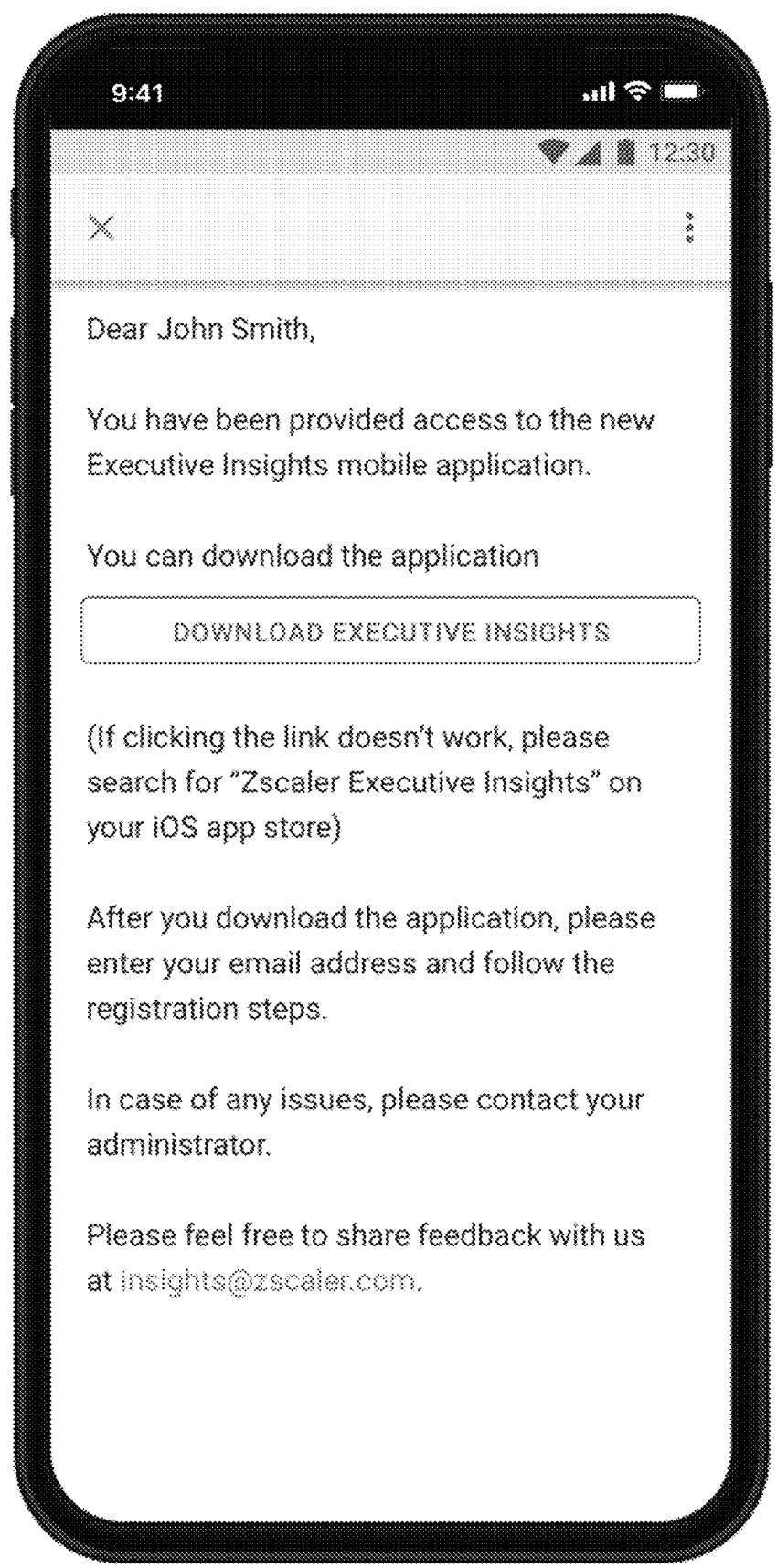
Figure 12:
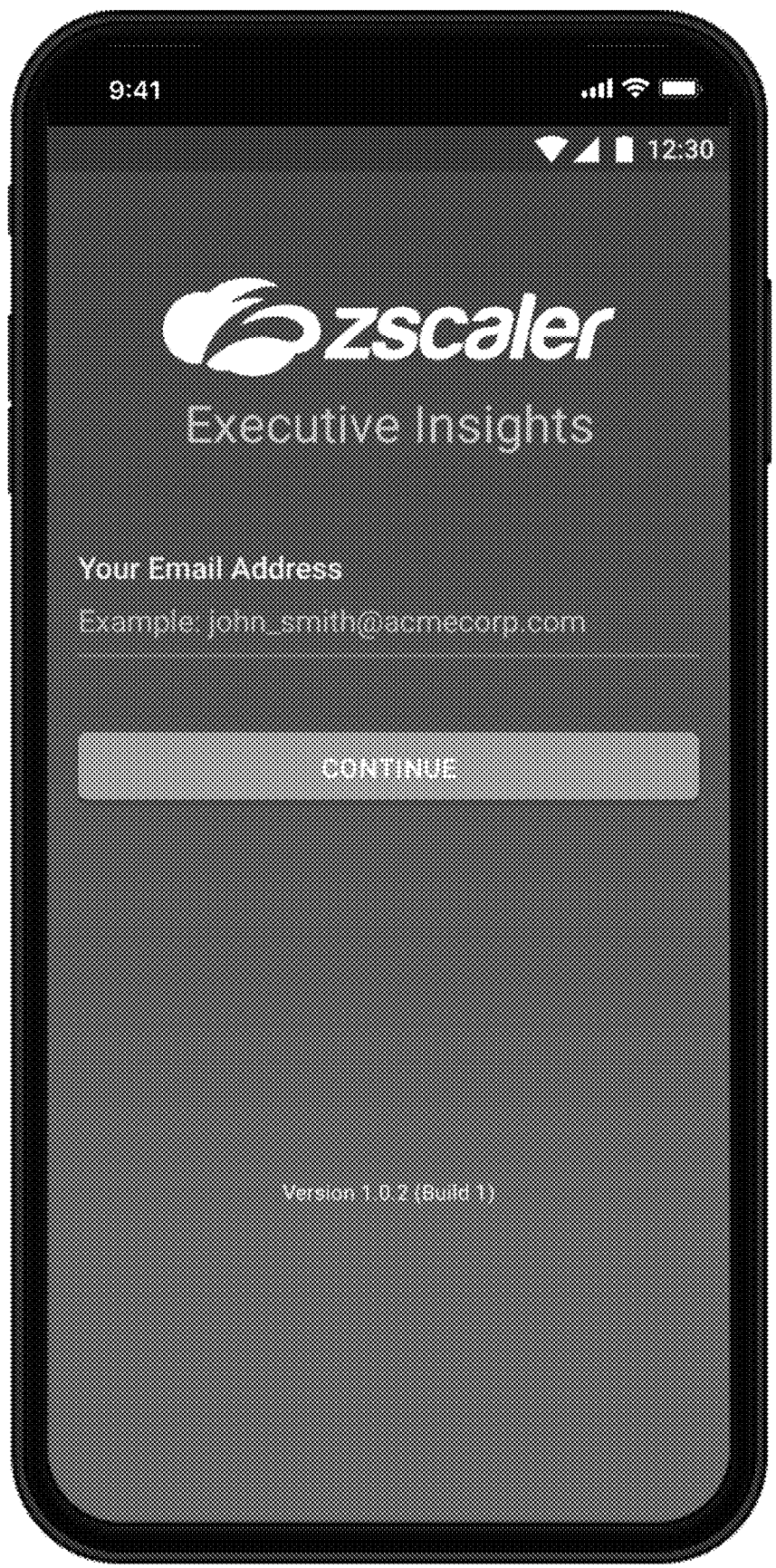
Figure 13:
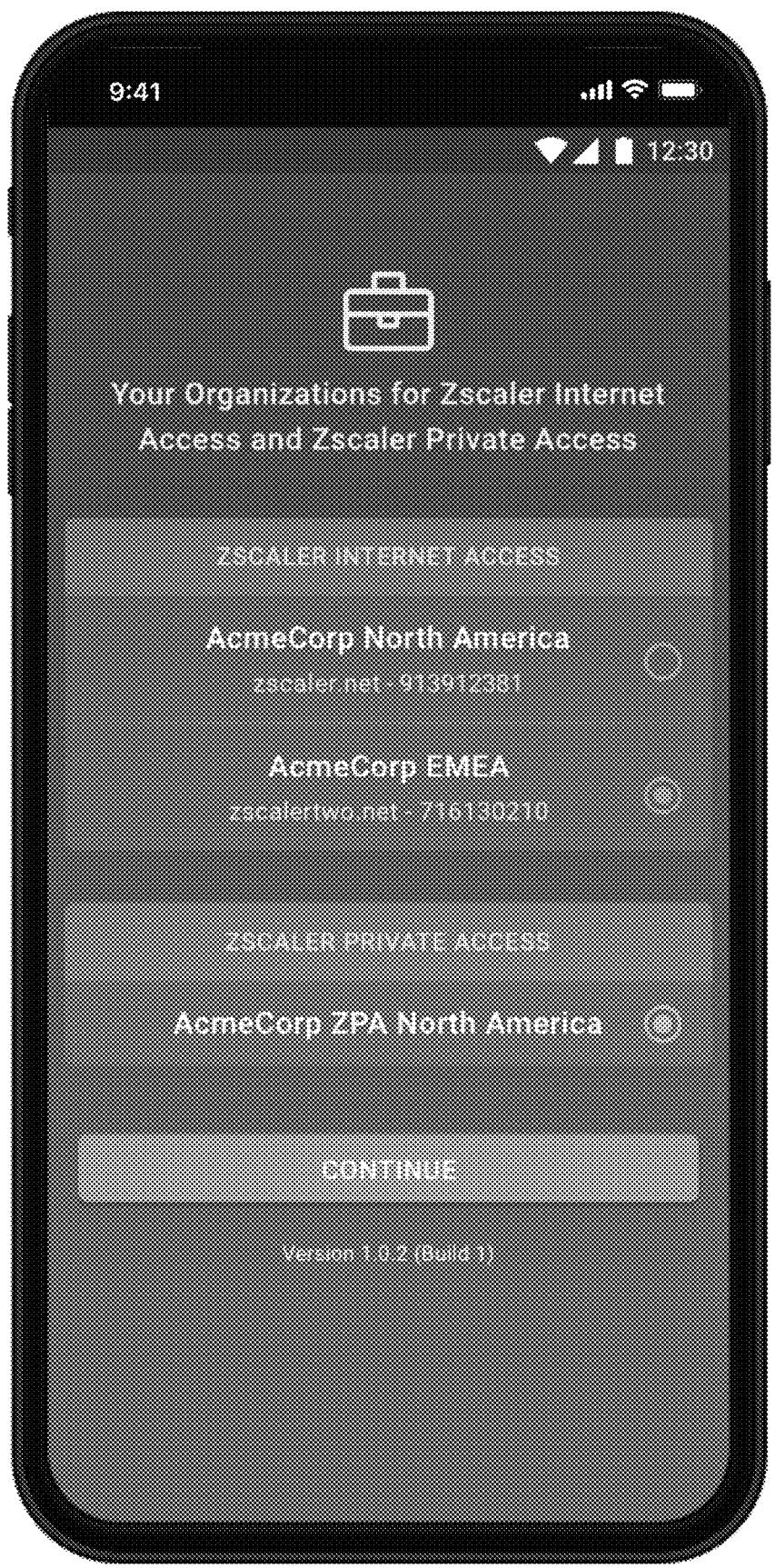

The user application 502 is meant for IT professionals of a tenant of the cloud-based security system 100. As such, the user 102 can be invited to the user application 502 (FIG. 10) with a prompt to download the user application 502 (FIG. 11). Alternatively, the user application 502 can be downloaded from various application stores or services. In operation, IT professionals with a tenant would be invited as needed. After installing the user application/UI 502 on a user device 300, and once the user 102 opens the application 502 for the first time and registers using an email that is tied to a user ID with executive insights permissions from the cloud-based security system 100 (FIG. 12). The user 102 could then receive a One Time Password (OTP) via email and once the OTP is entered the next step would be choosing an organization IDs from one or more of the cloud security service, the ZTNA service, and the UX service that the user 102 would be interested in seeing the data from (FIG. 13). In the example of FIG. 13, the tenants include ZIA and ZPA as described herein, but those skilled in the art will recognize this is only one example of a cloud security service and a ZTNA service, and others are contemplated. Once the application 502 is successfully provisioned, the user 102 would not have to log in again for a period of time. The cloud-based security system 100 is multi-tenant, and each tenant has a unique organization ID. The organization ID is utilized to determine which insights are visualized via the application 502. In the example of FIG. 13, there are three organization IDs—all from the same tenant, "AcmeCorp," but one for ZIA North America, one for ZIA EMEA, and one for ZPA North America.

Summary

Figure 14:
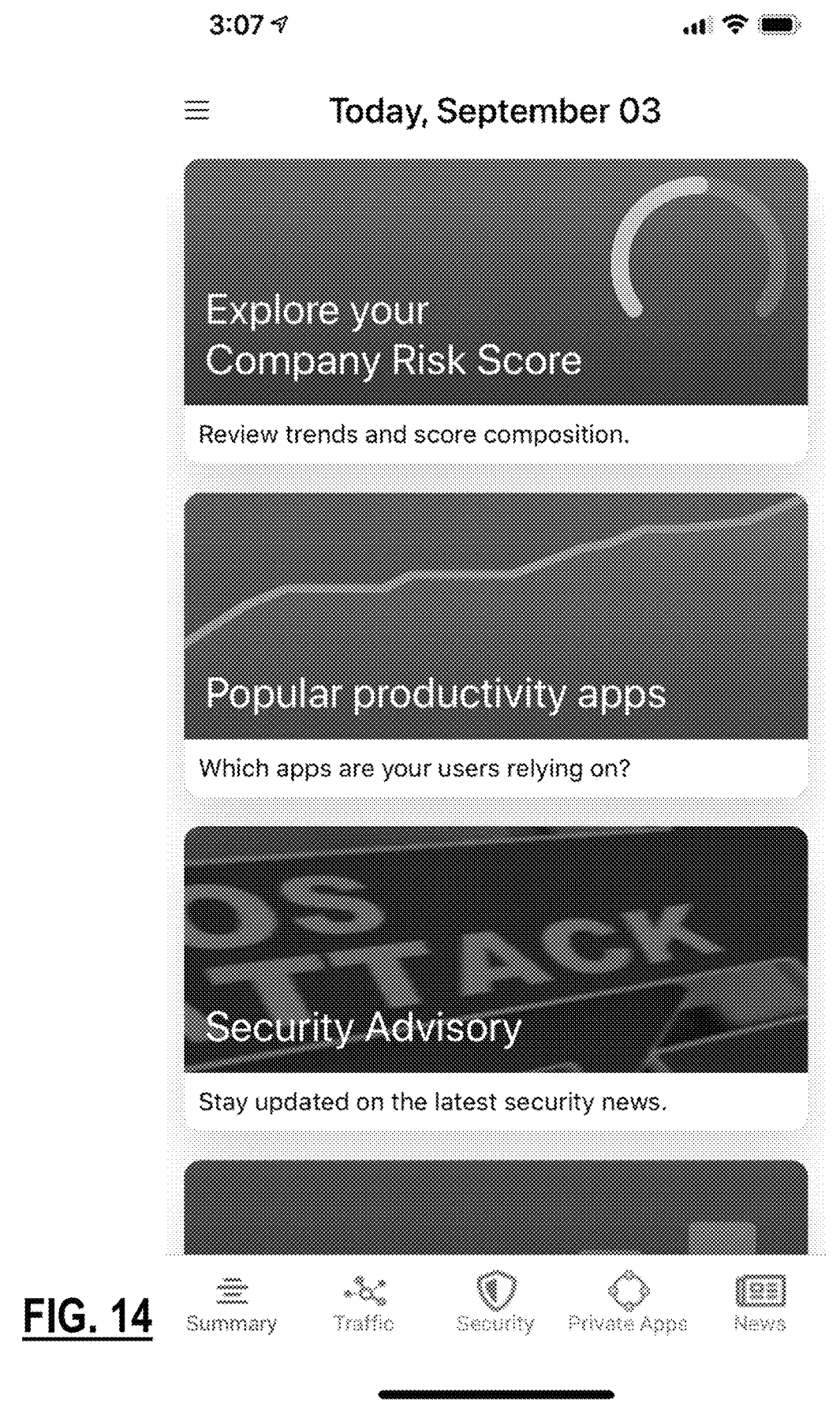
Figure 15:
Figure 16:
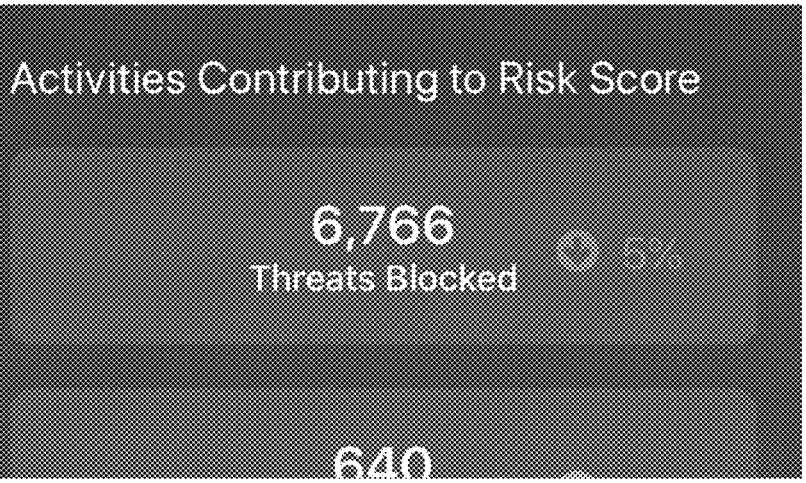

The initial customer experience starts with a Summary screen (FIGS. 14-16). FIG. 14 is a landing page with different topics to explore, exploring the company's (tenant) risk score, visualizing which applications the users 102 of the tenant are using, view the latest security advisories, etc. FIG. 15 is another landing page with tiles—news, security updated, product & operation updates, etc. FIG. 16 is a screen showing the risk score, which is a metric determined over time based on the operations of the cloud-based security and the activity of a tenant's users.

This dynamic section represents a feed of most important events that occurred recently and is unique to the user's 102 organization. The events include any traffic or security changes that are marked as potentially critical by the application's algorithms. The examples include an increase/decrease in Overall Traffic/Company Risk Score/Security Traffic, as well as relevant industry news.

Traffic

Figure 17:
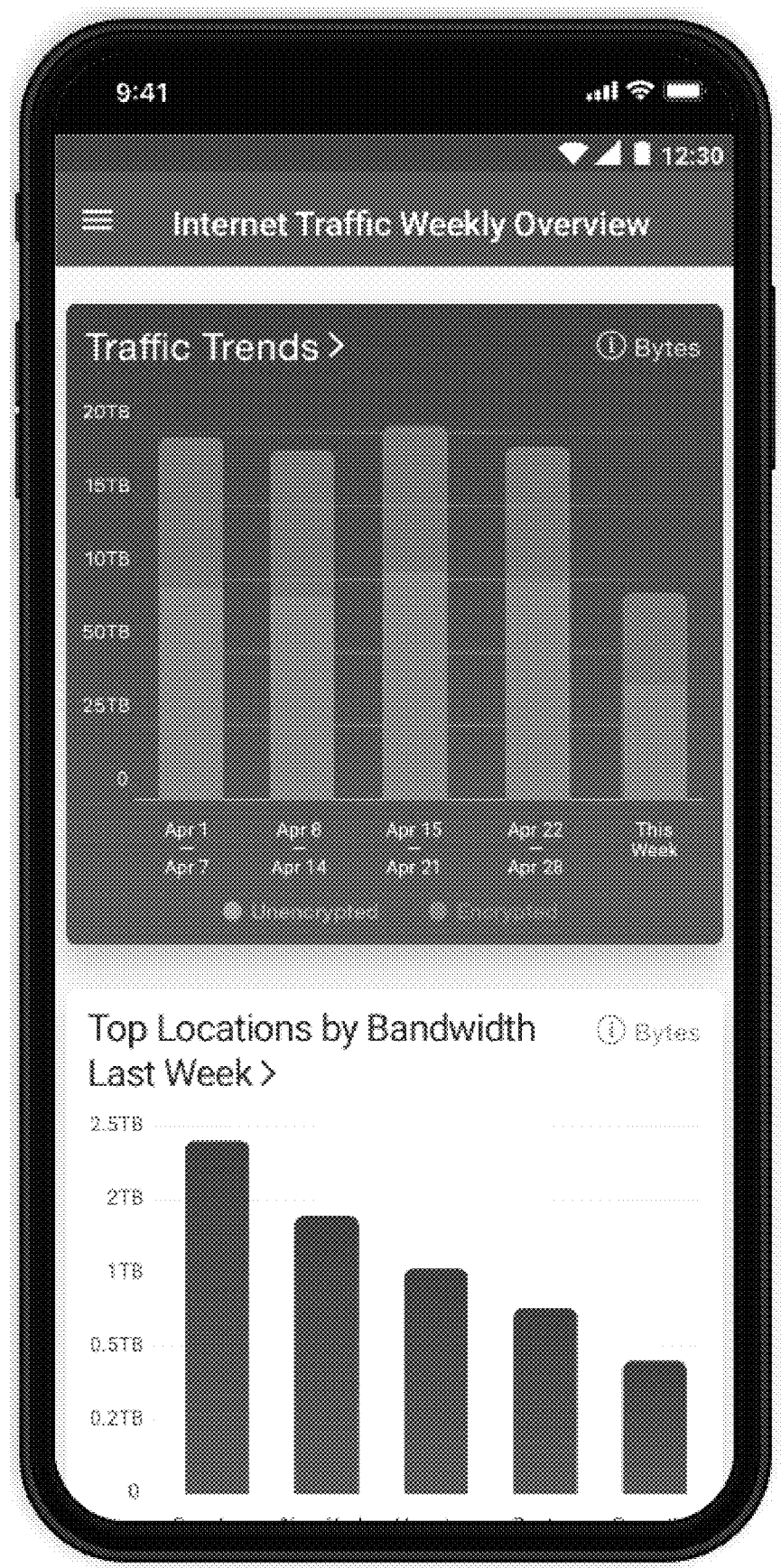
Figure 18:
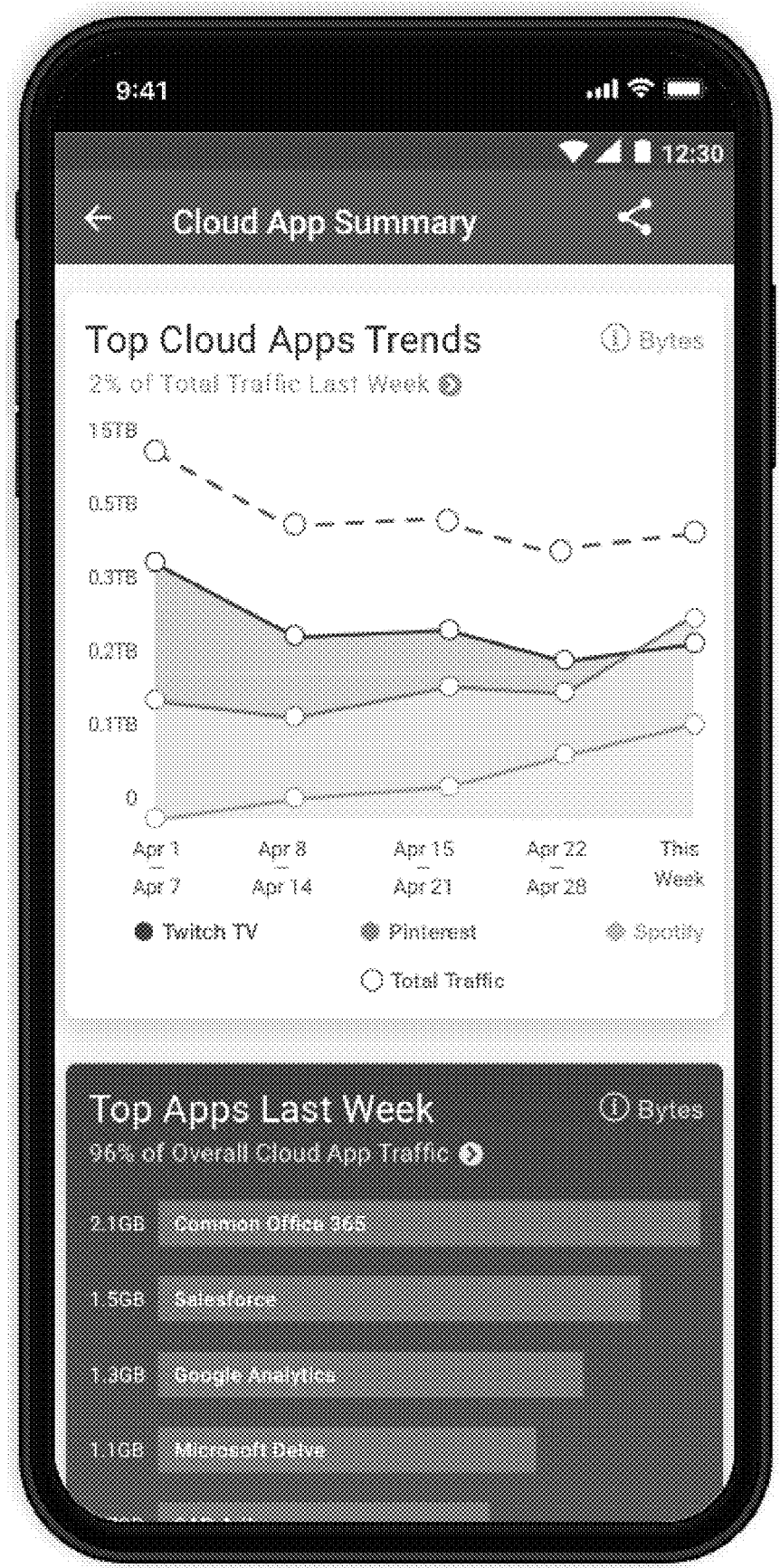
Figure 19:
Figure 20:
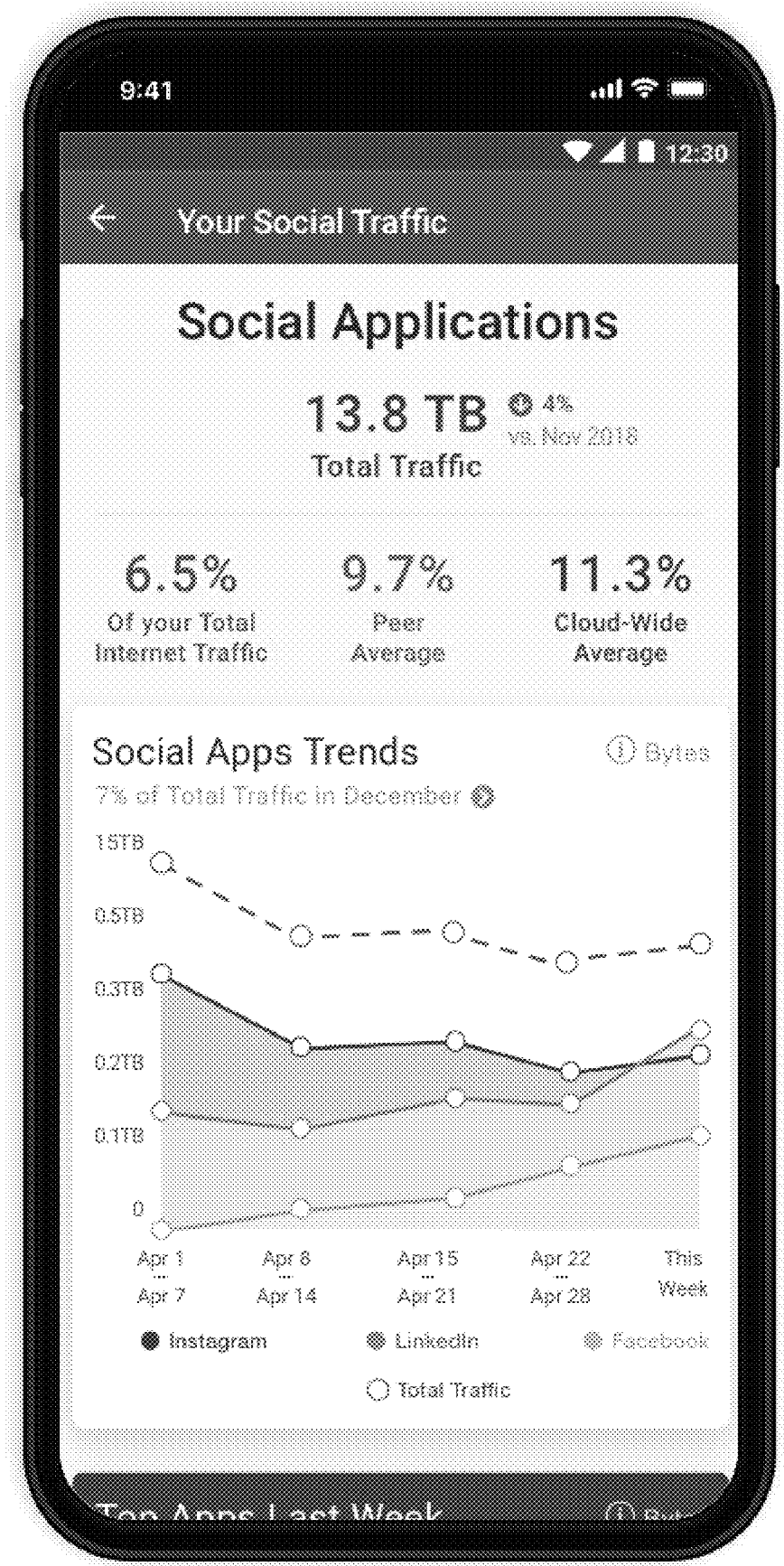
Figure 21:
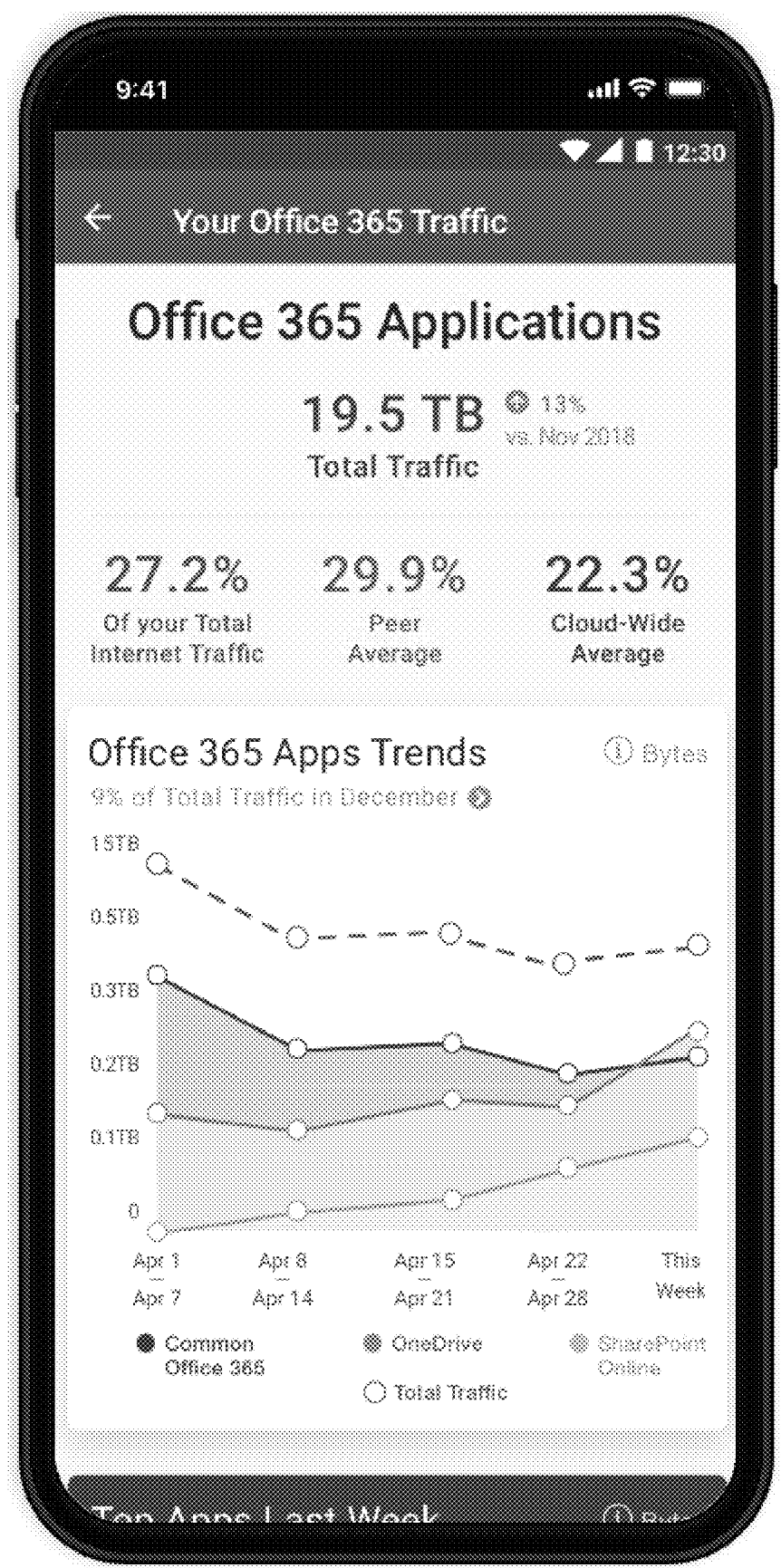
Figure 22:
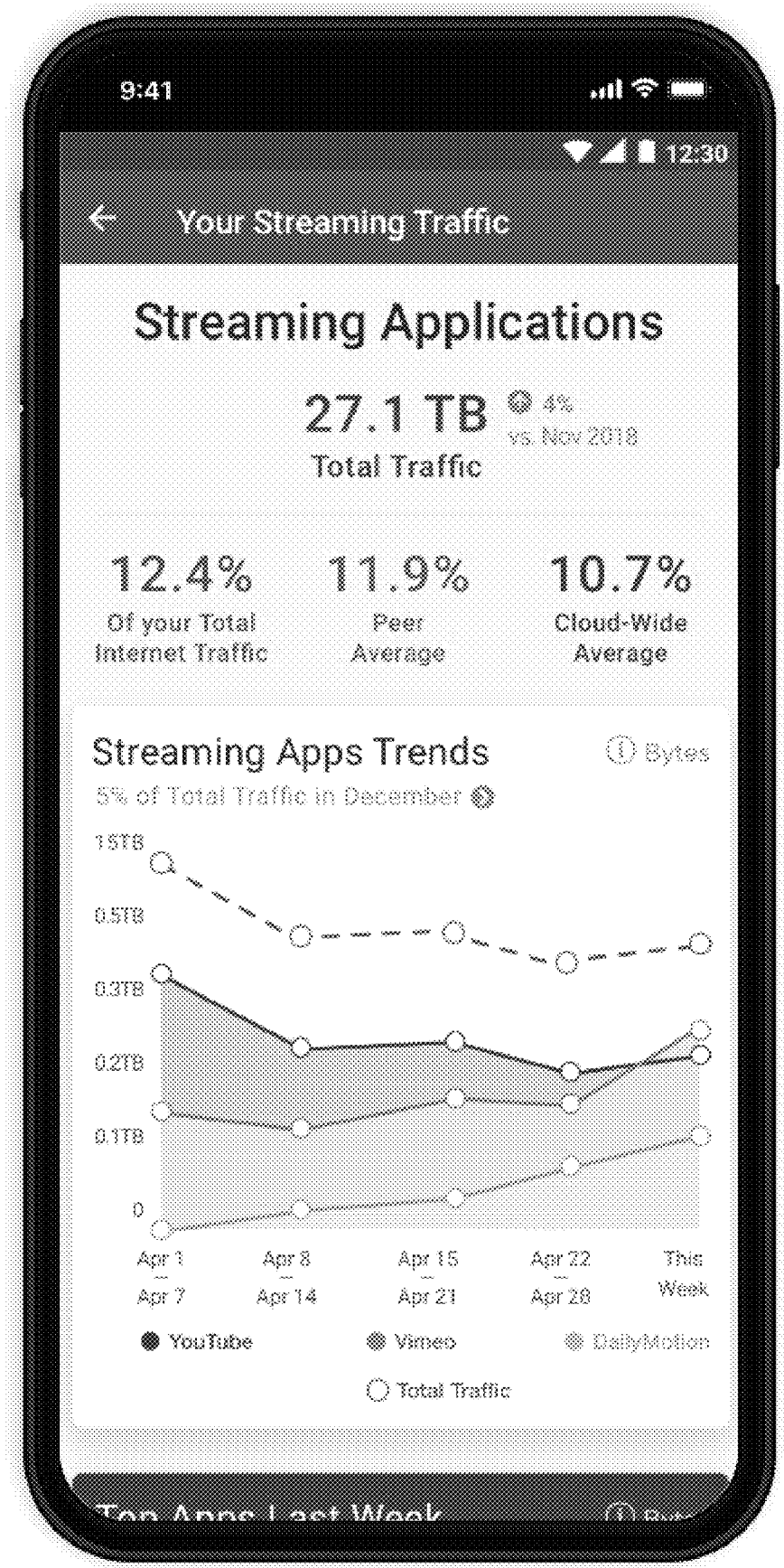
Figure 23:
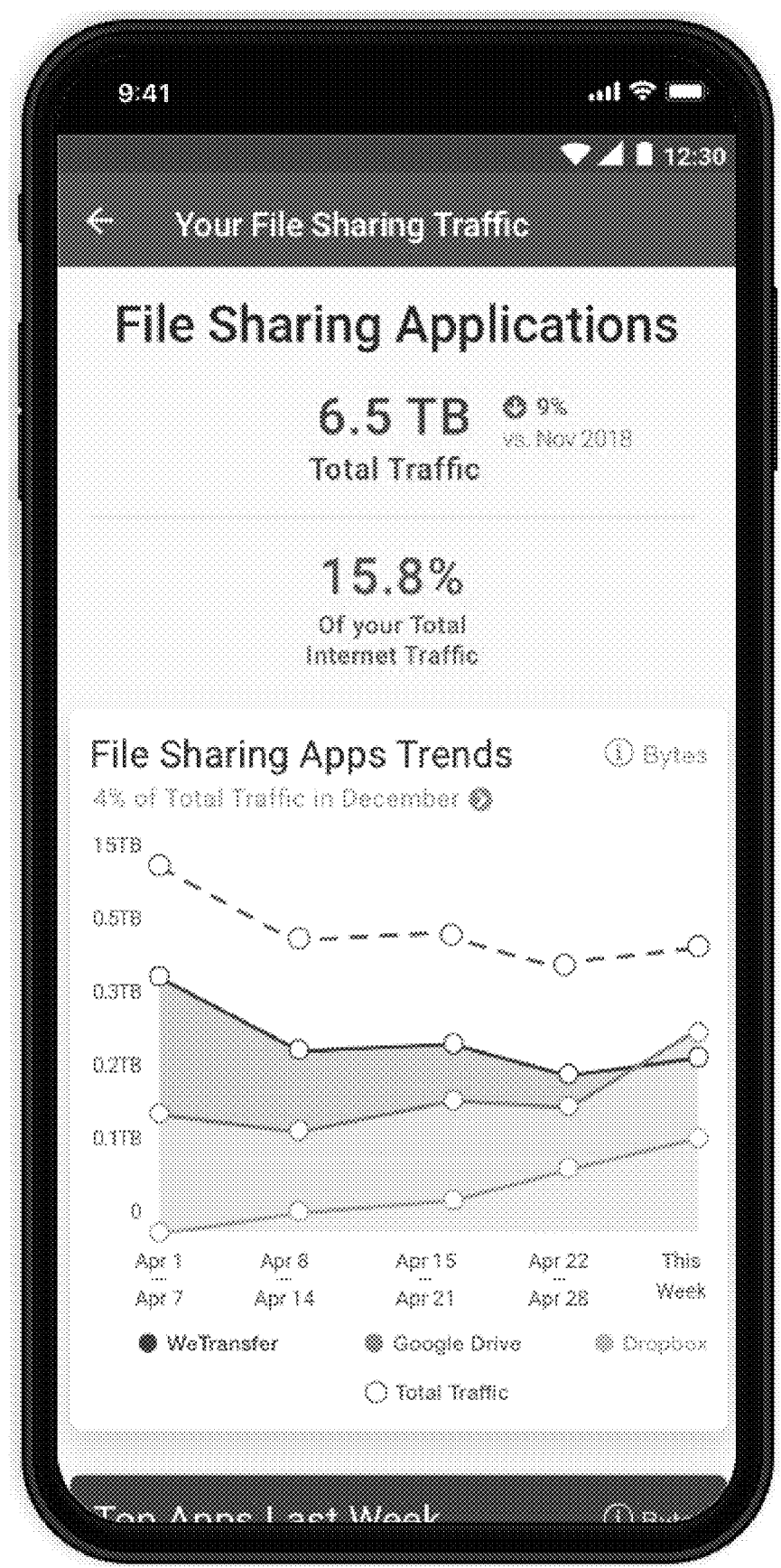
Figure 24:
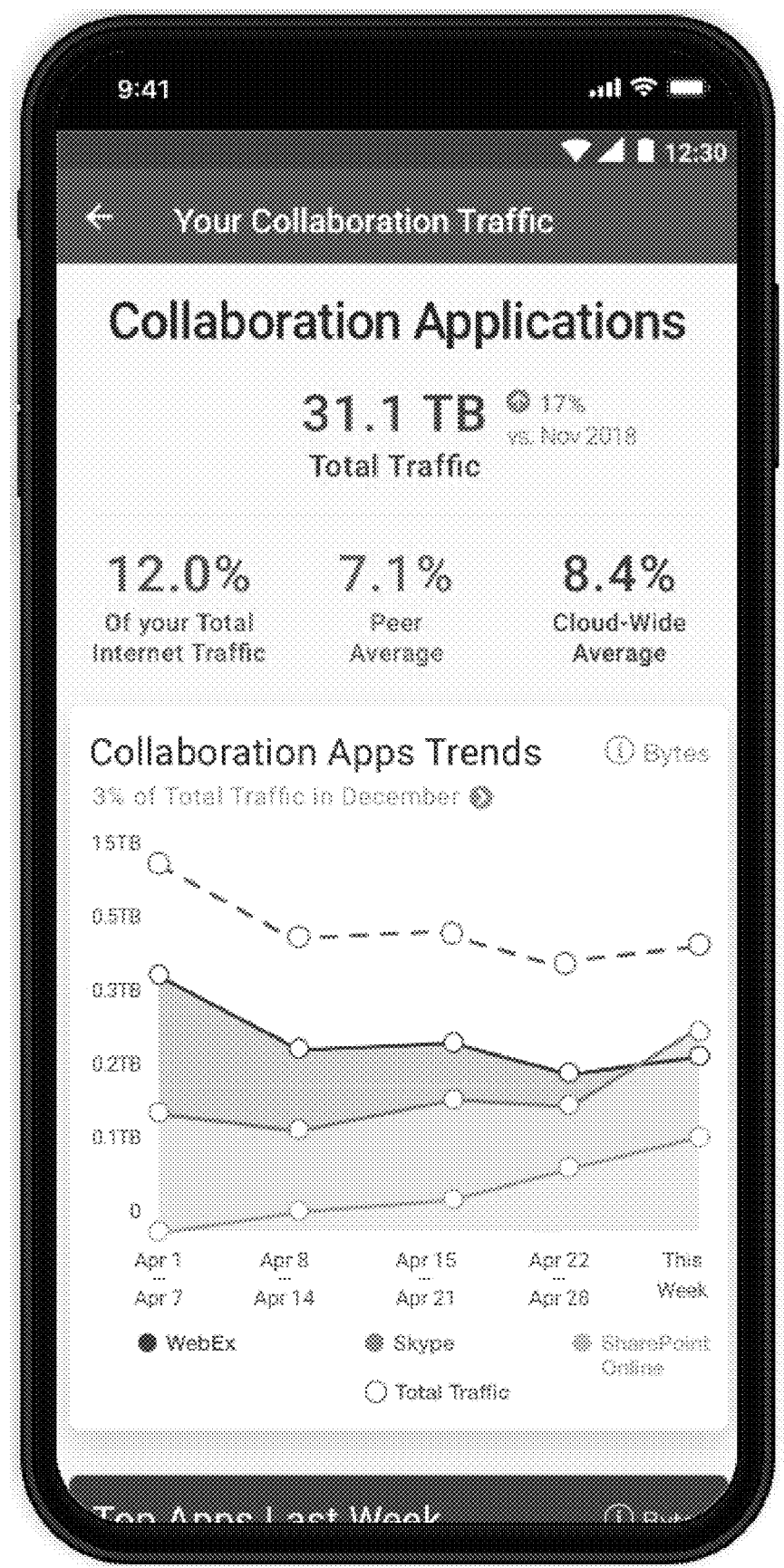
Figure 25:
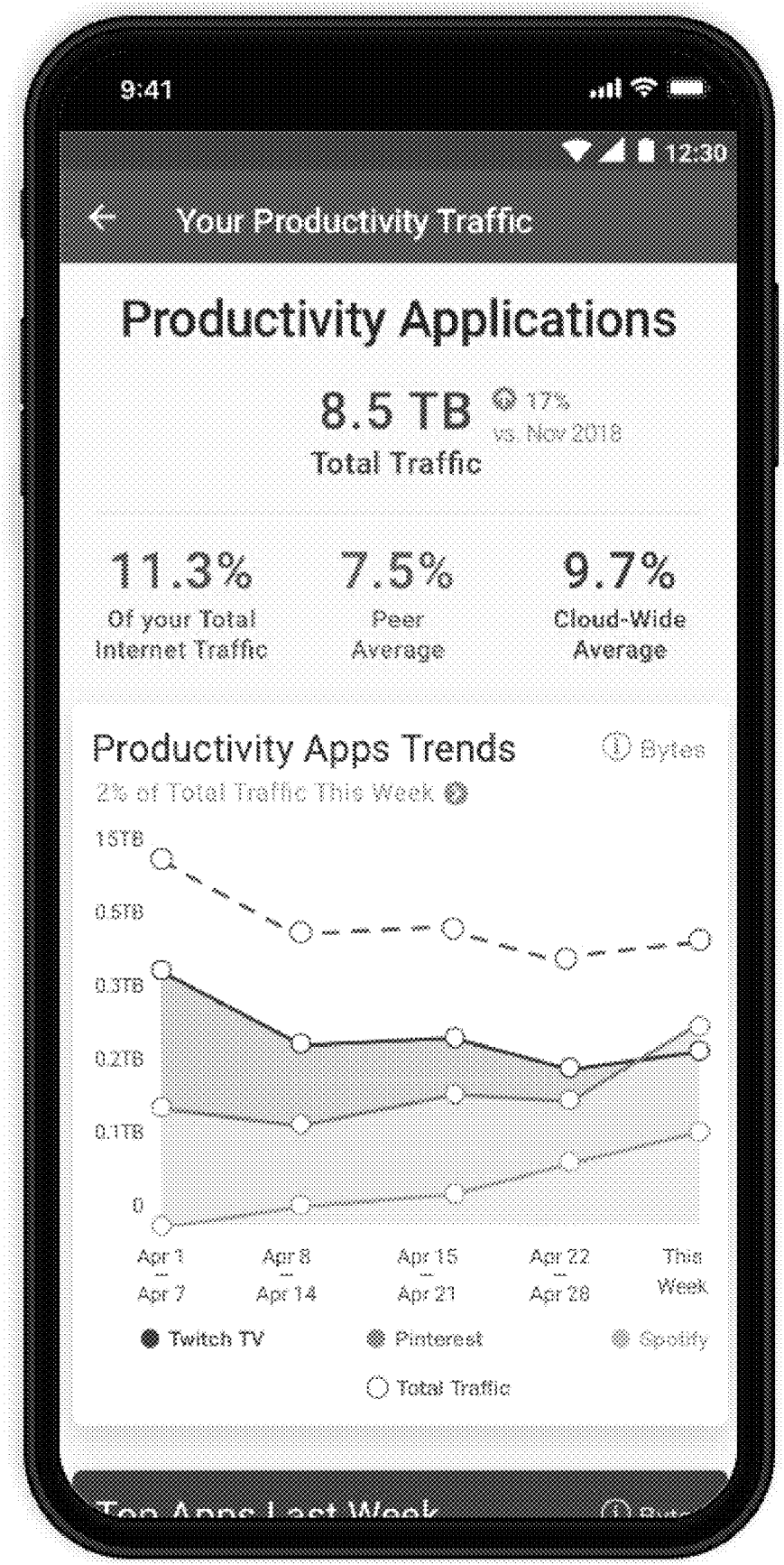

There are various sections for summarizing a tenant's traffic (FIGS. 17-26). In FIG. 17, the user 102 is presented with different widgets: Traffic Trends, Top Locations by Bandwidth, and Top Departments by Bandwidth. Each one of those widgets can be opened after a click if the user 102 is interested in being presented with more details. This user interface pattern is called the card metaphor and applies to the rest of the sections in the application 502 as well. At the bottom of the page, the user 102 can be provided with an option to Explore his/her Cloud Applications. After opening the section, the user 102 is presented with Top Cloud App Trends (FIG. 18) or Top Apps in a time period (FIG. 19), as well as Top Apps widgets that each focus on Cloud Application-specific insights from the cloud-based security system 100 (FIGS. 20-26).

Figure 26:
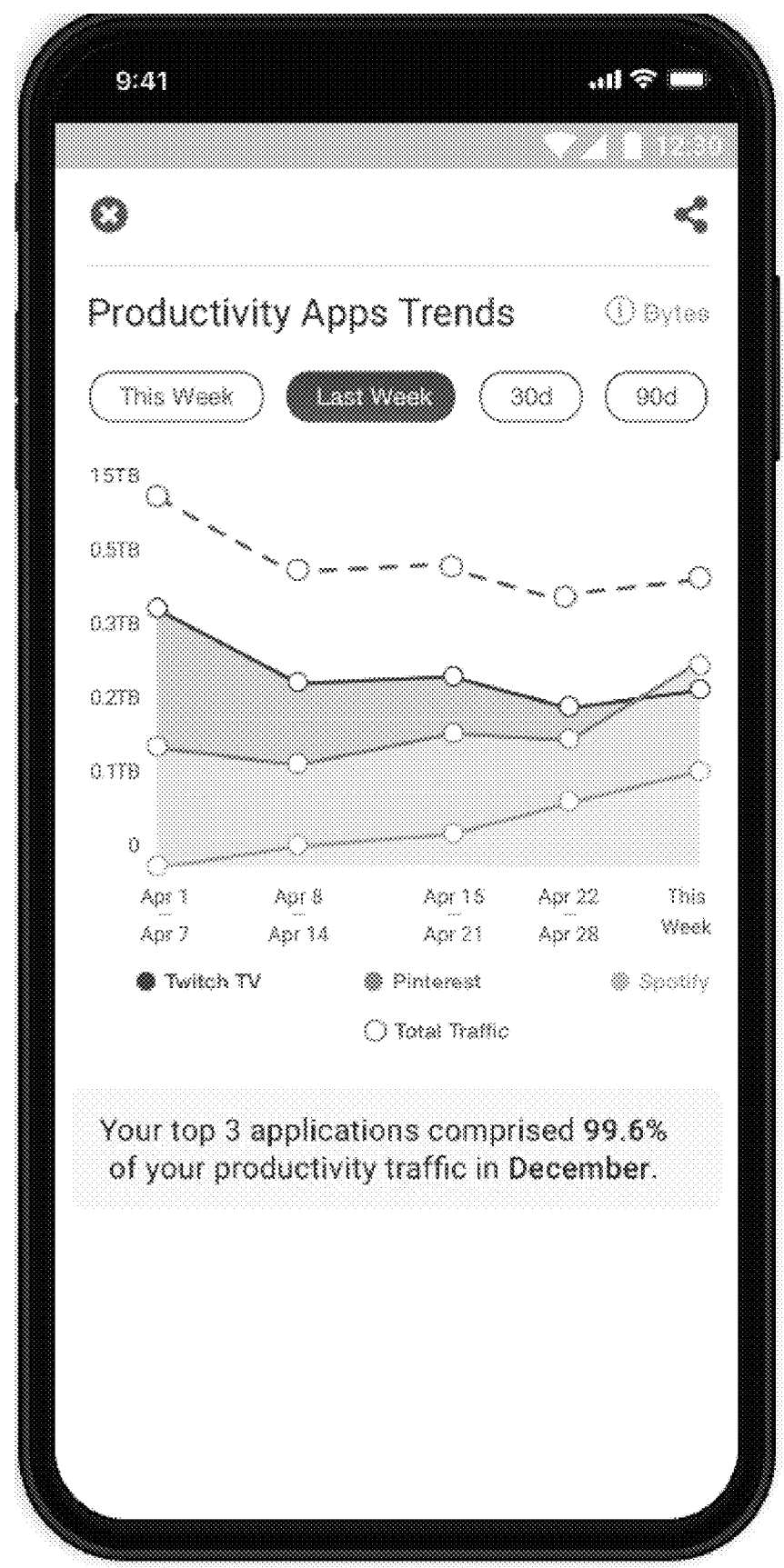
Figure 27:
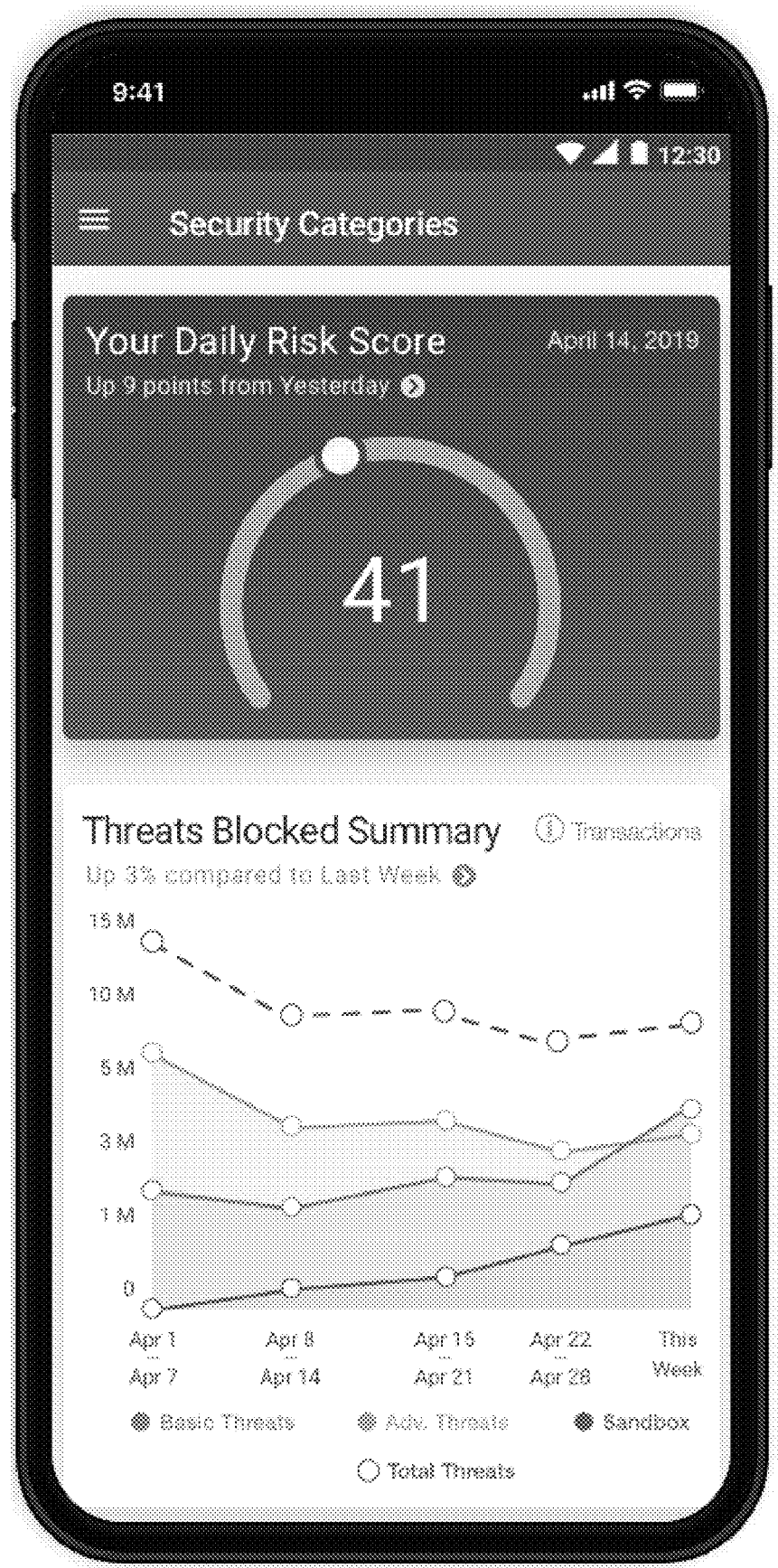
Figure 28:
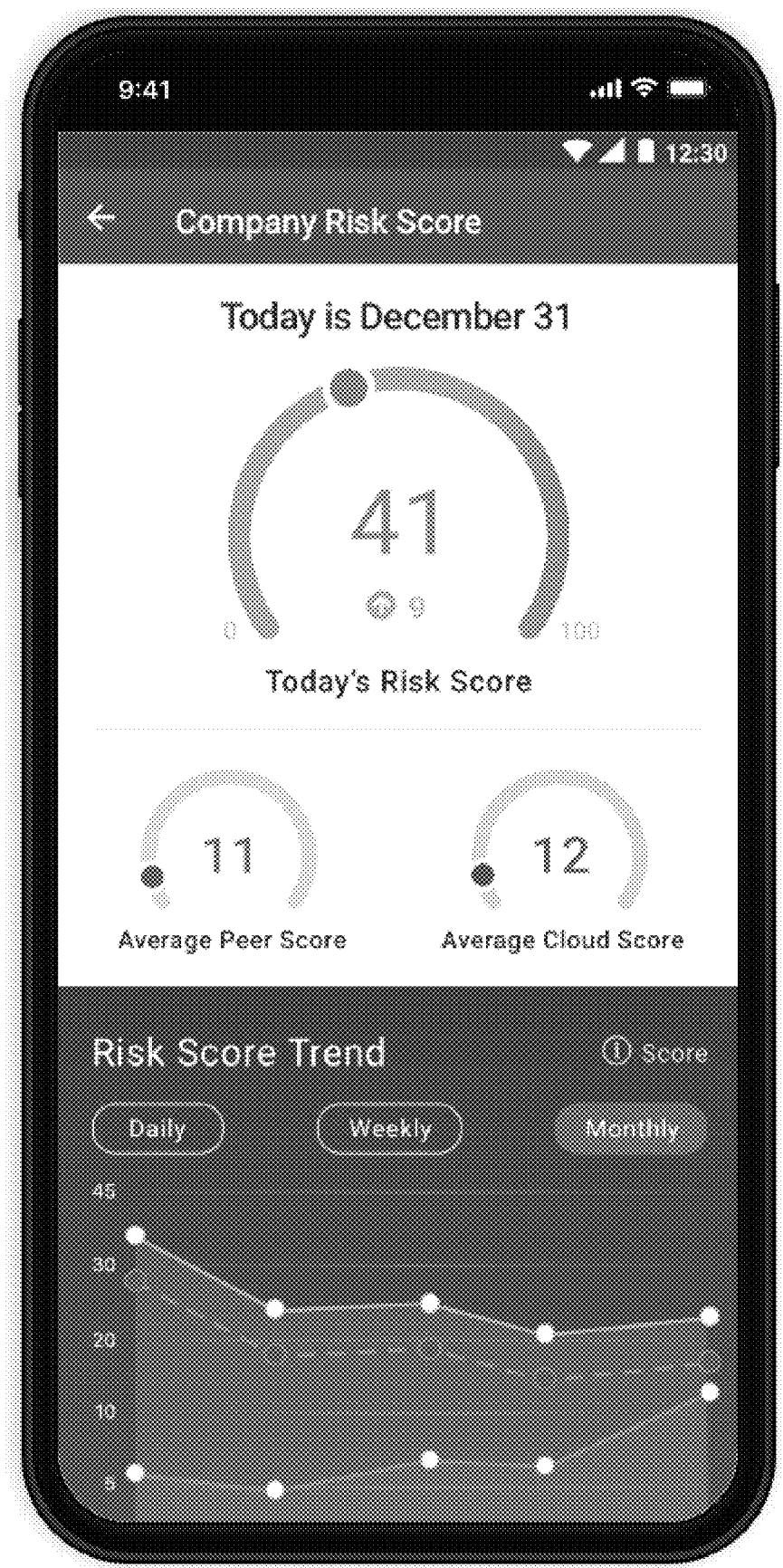
Figure 29:
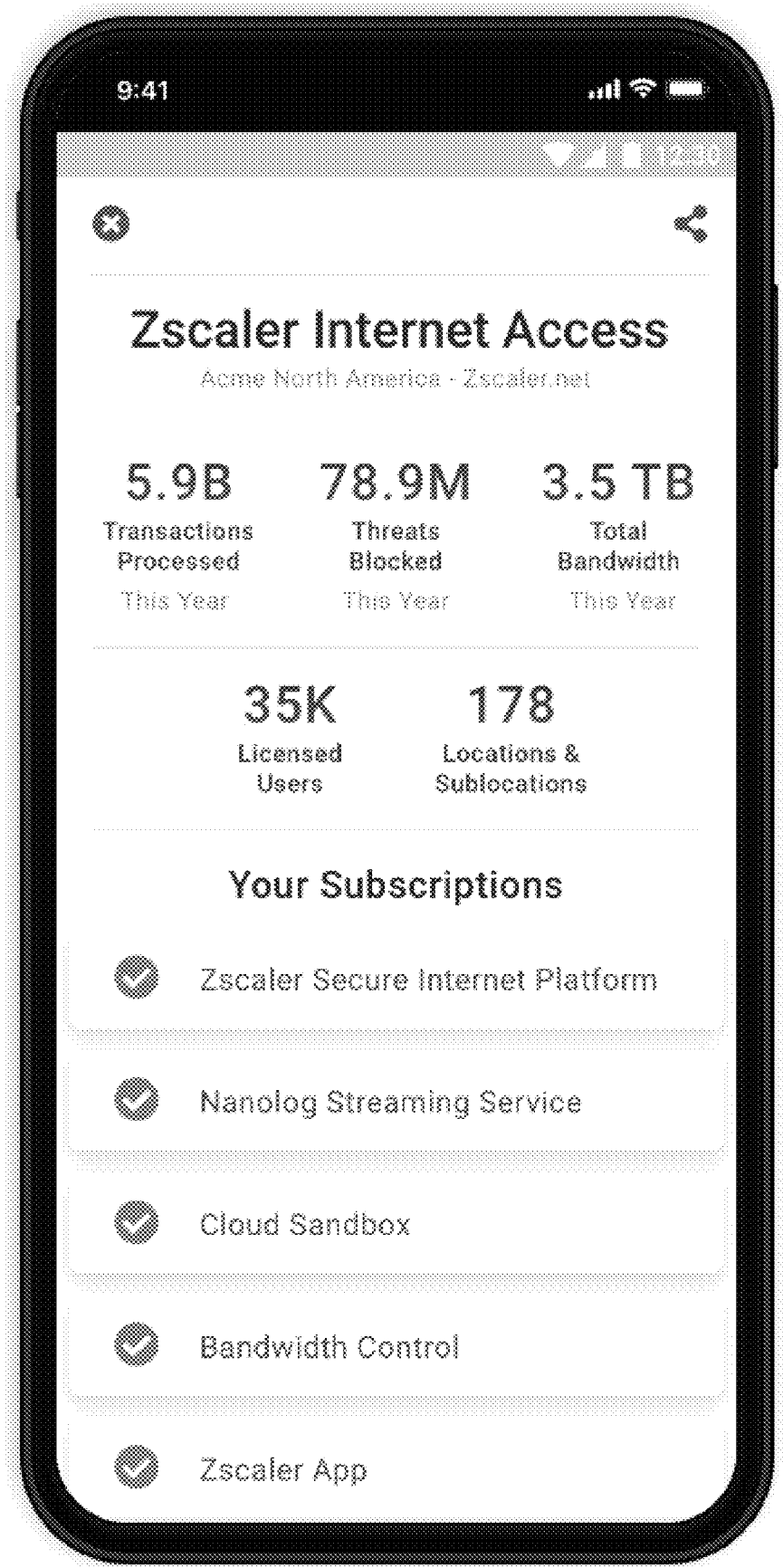

If the user 102 is interested in exploring more granular Cloud Application information by category, then he/she would be able to click one of these options at the bottom of the page: Social Cloud Apps (FIG. 20), Office 365 (FIG. 21), Streaming Cloud Apps (FIG. 22), File Sharing Cloud Apps (FIG. 23), Collaboration Cloud Apps (FIG. 24), Productivity Cloud Apps (FIG. 25), and Productivity Cloud App trends (FIG. 26). Advantageously, because the cloud-based security system 100 is inline, it can provide granular data on a per user per tenant basis, including all transactions. As such, the application 502 can provide useful insights into the users 102 of a tenant over time.

Security

Figure 30:
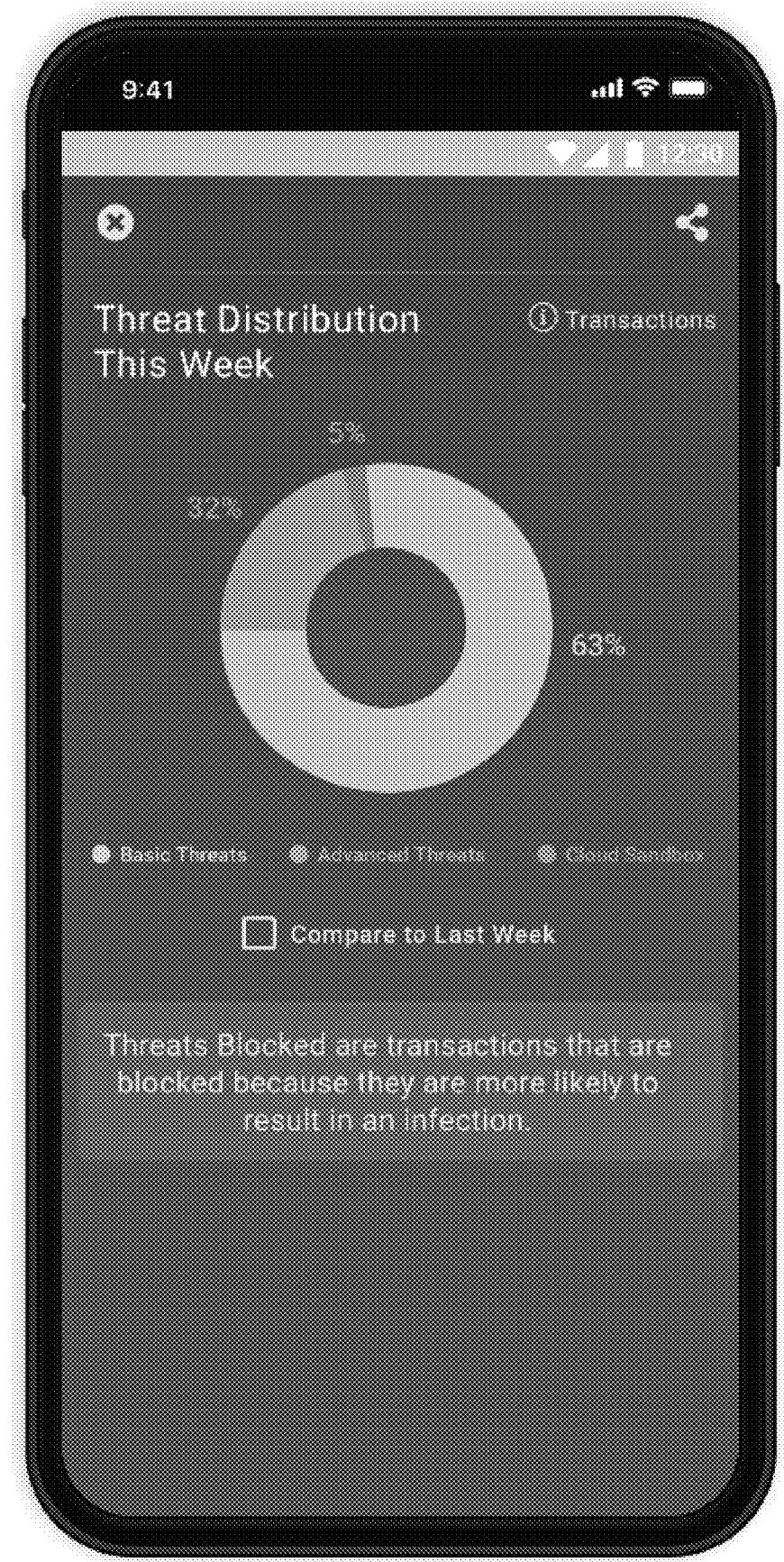
Figure 31:
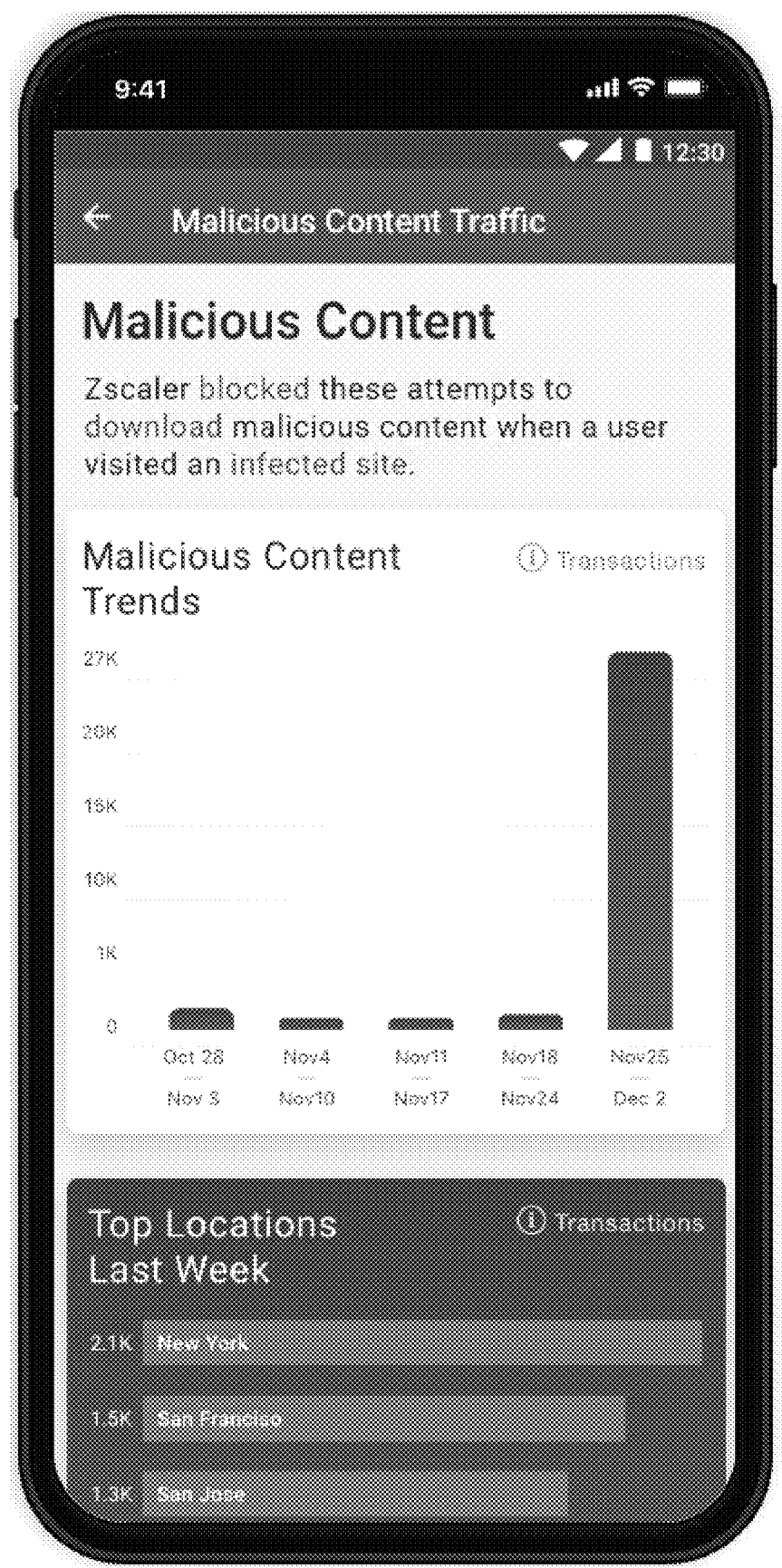
Figure 32:
Figure 33:
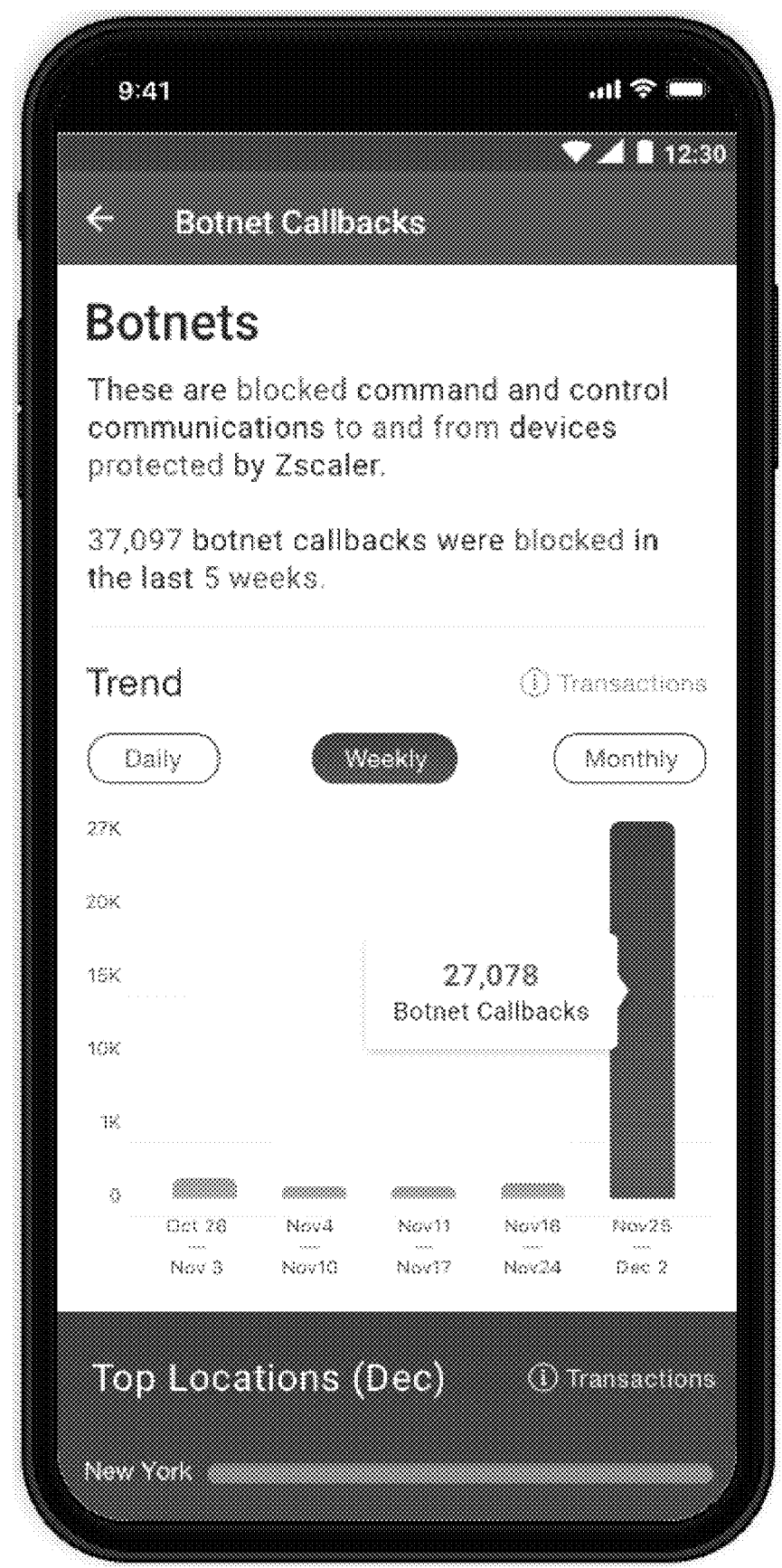
Figure 34:
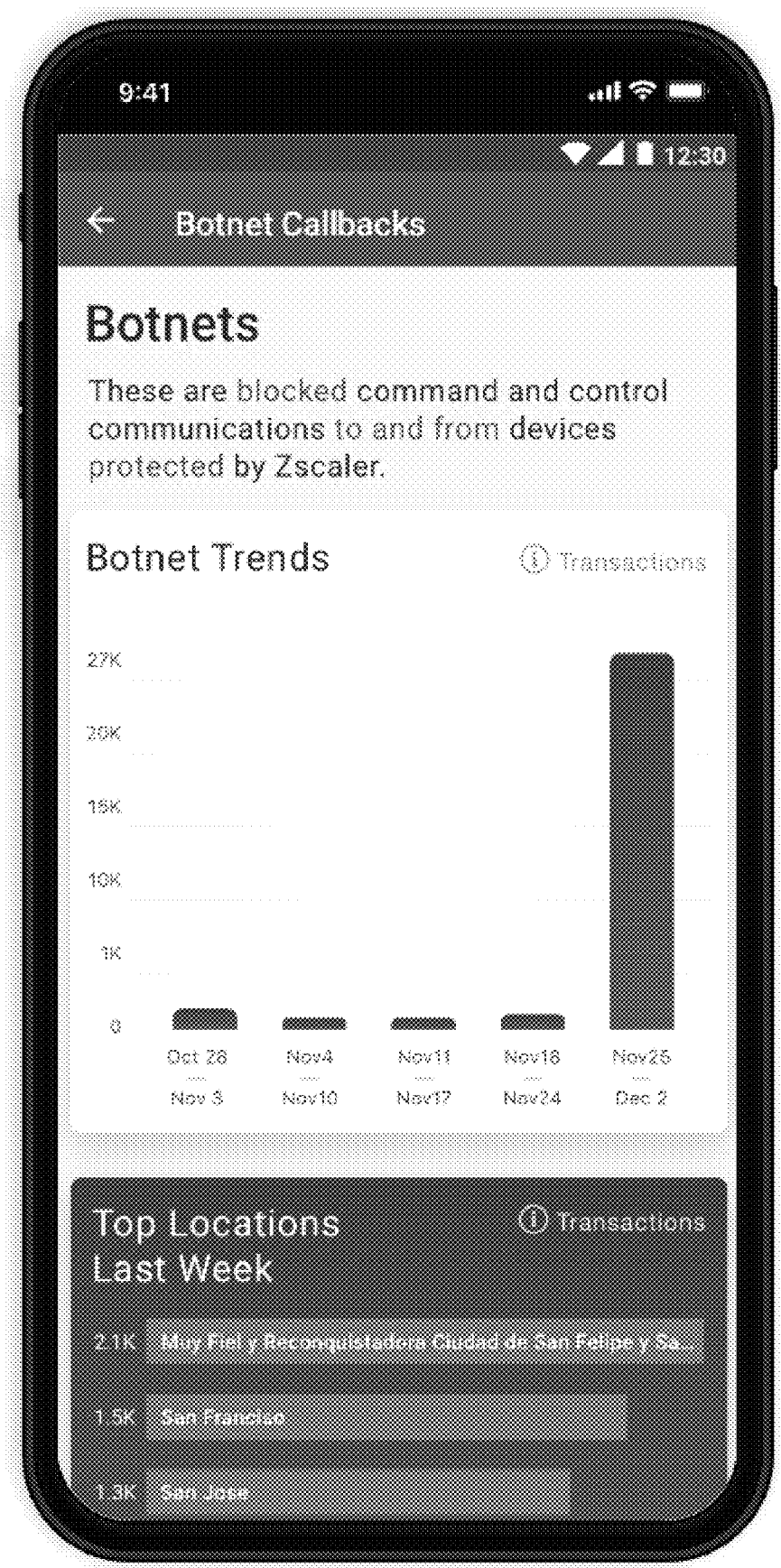
Figure 35:
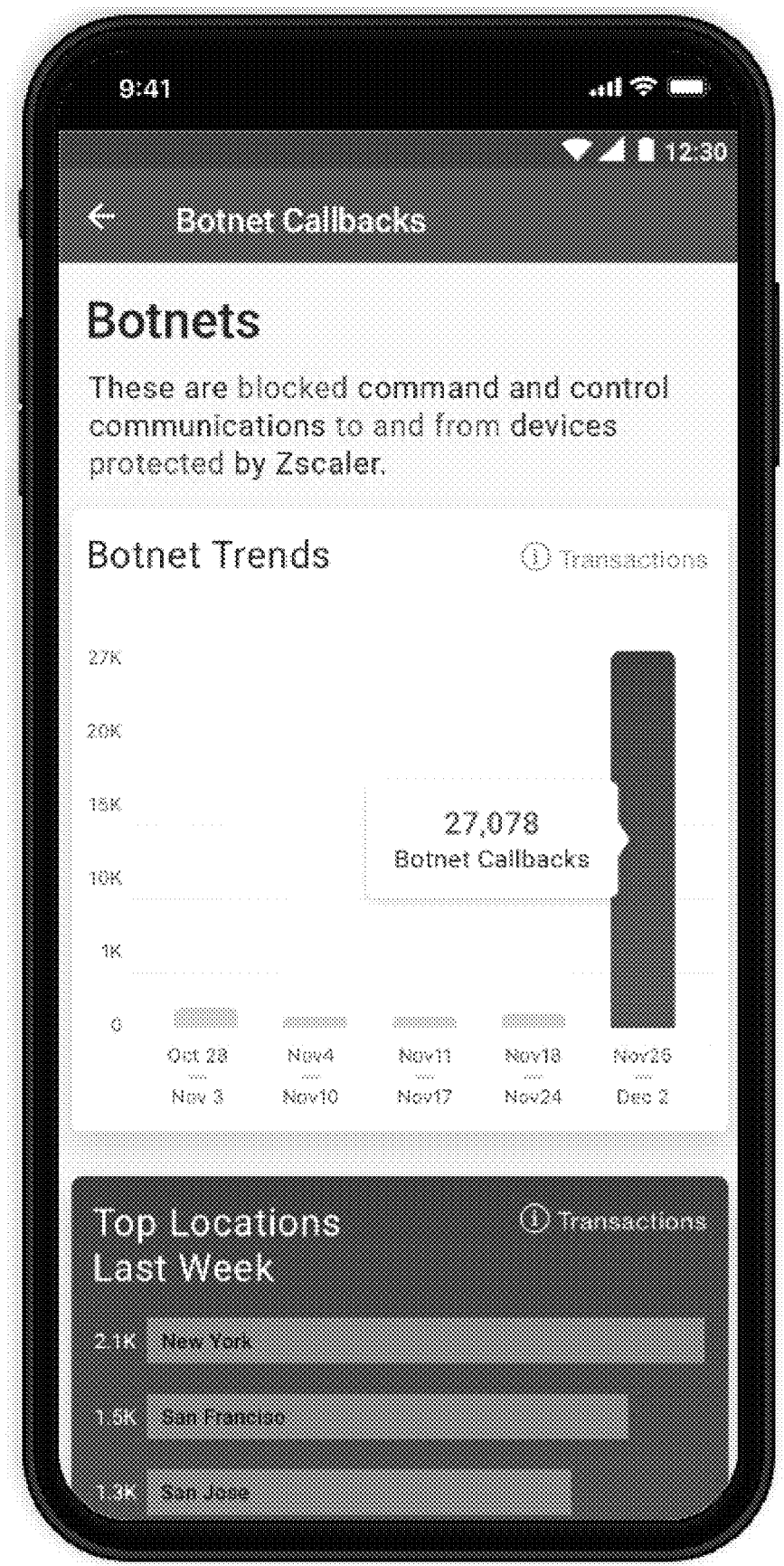

The security section starts with "Your Daily Risk Score" (FIG. 27), which represents a score for the entire user's 102 organization, from 1-100. Of course, other ranges or values could be used. The higher the score, the more at risk the organization is, from a security point of view. The detailed Company Risk Score report is available by clicking on the corresponding widget (FIG. 28), with Average and Cloud scores for comparison, as well as the Activities Contributing to Risk Score, Risk Score Trend for the last seven days and the percentage of High-Risk Users within the organization. There can be a landing page for ZIA (FIG. 29) which provides data about transactions processed, threats blocked, total bandwidth, number of users, locations & sublocations, as well as cloud service subscriptions Then the application is showing the Overall Threats Blocked by Category (Antivirus Threats, Sandboxed Threats, Advanced Threats) compared to Total Threats Blocked (FIG. 30). Followed by the Threat Distribution by Category. Other widgets include the Top Locations by the Number of Threats Blocked, Top Departments by Threats Blocked, Sandboxed Threats Blocked, and Advanced Threats Blocked (FIGS. 31-35). Other widgets can show information about Browser Exploits, Phishing, and Cross-Site Scripting.

ZTNA

Figure 36:
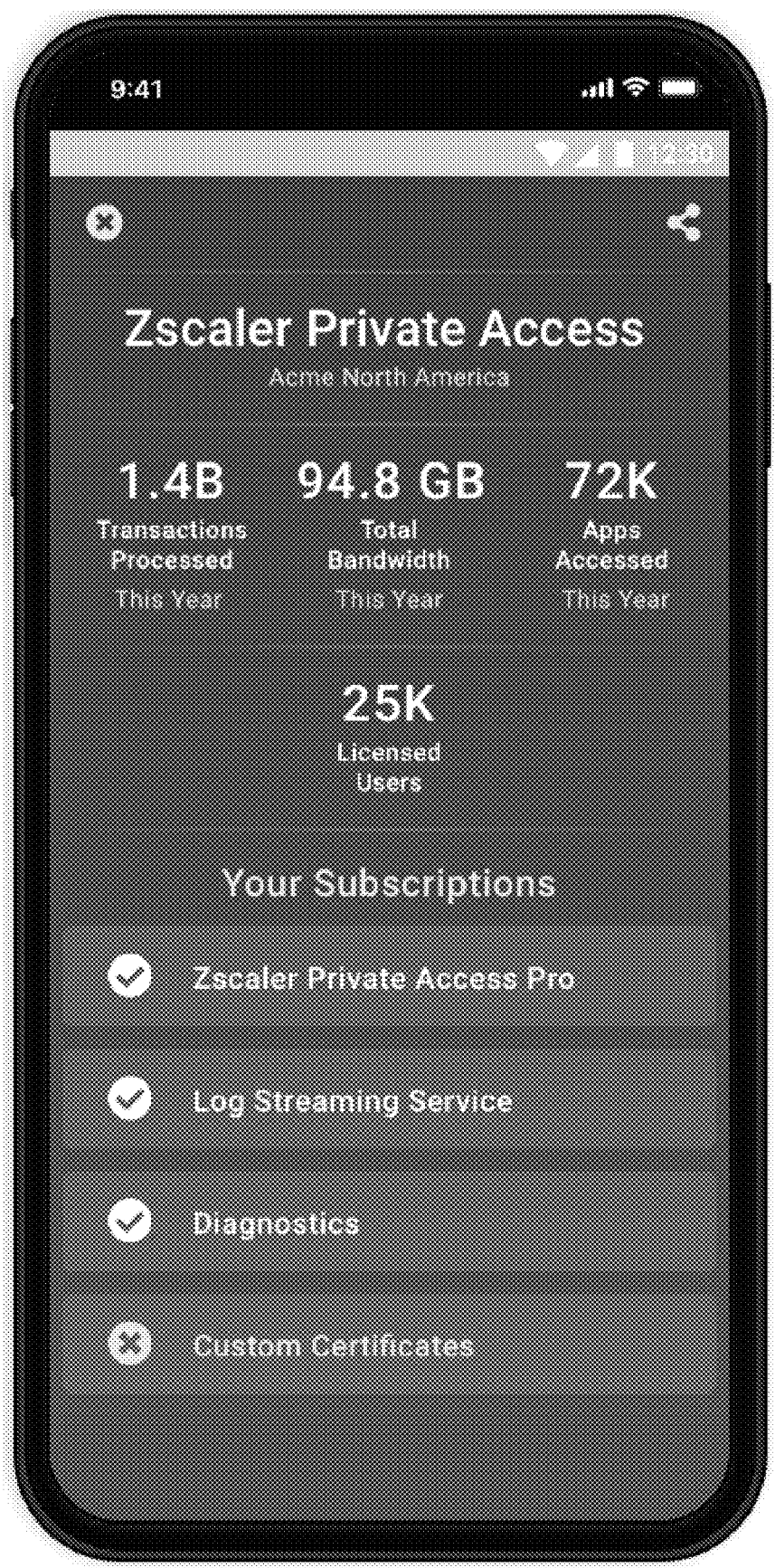
Figure 37:
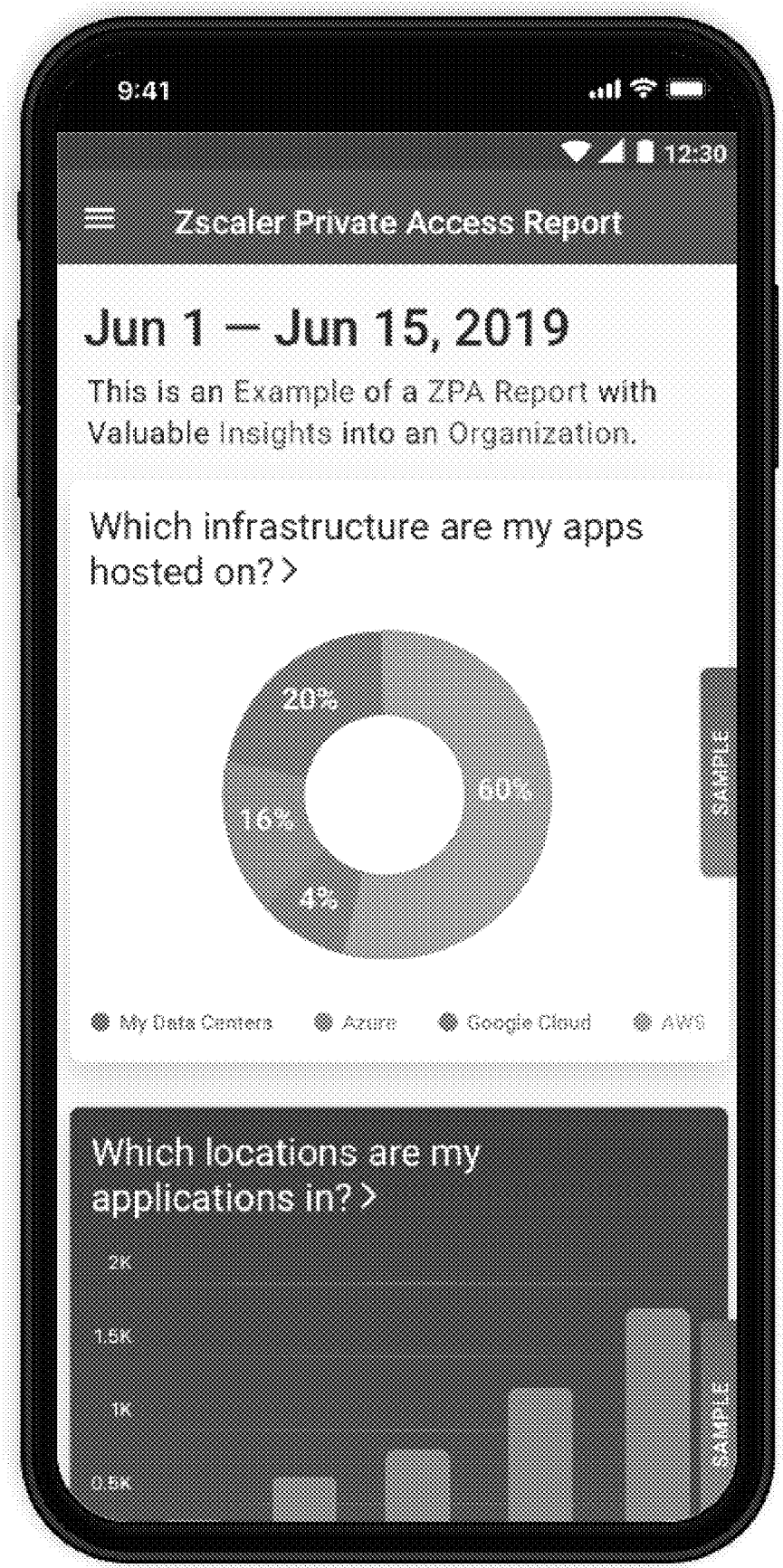
Figure 38:
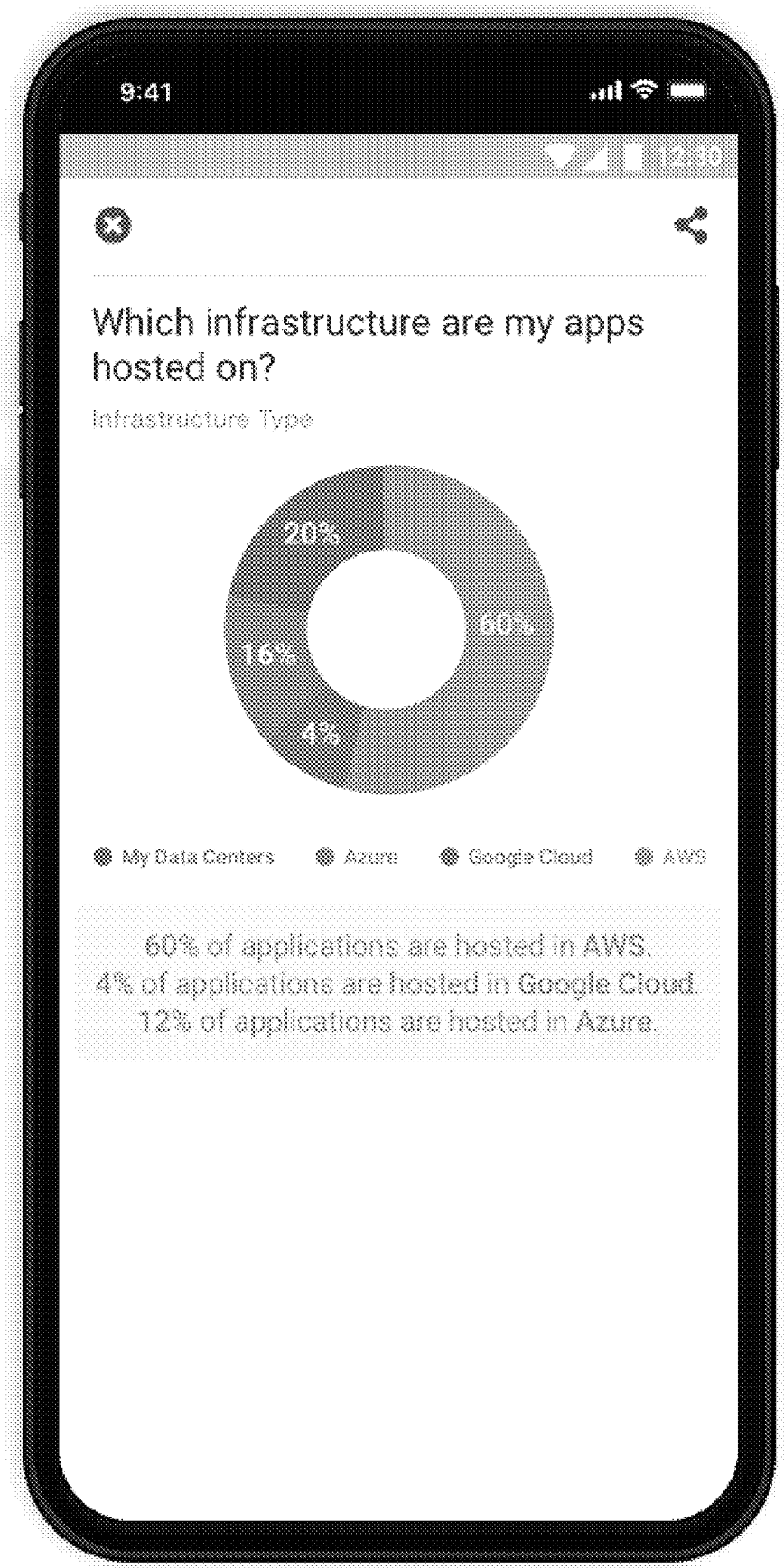
Figure 39:
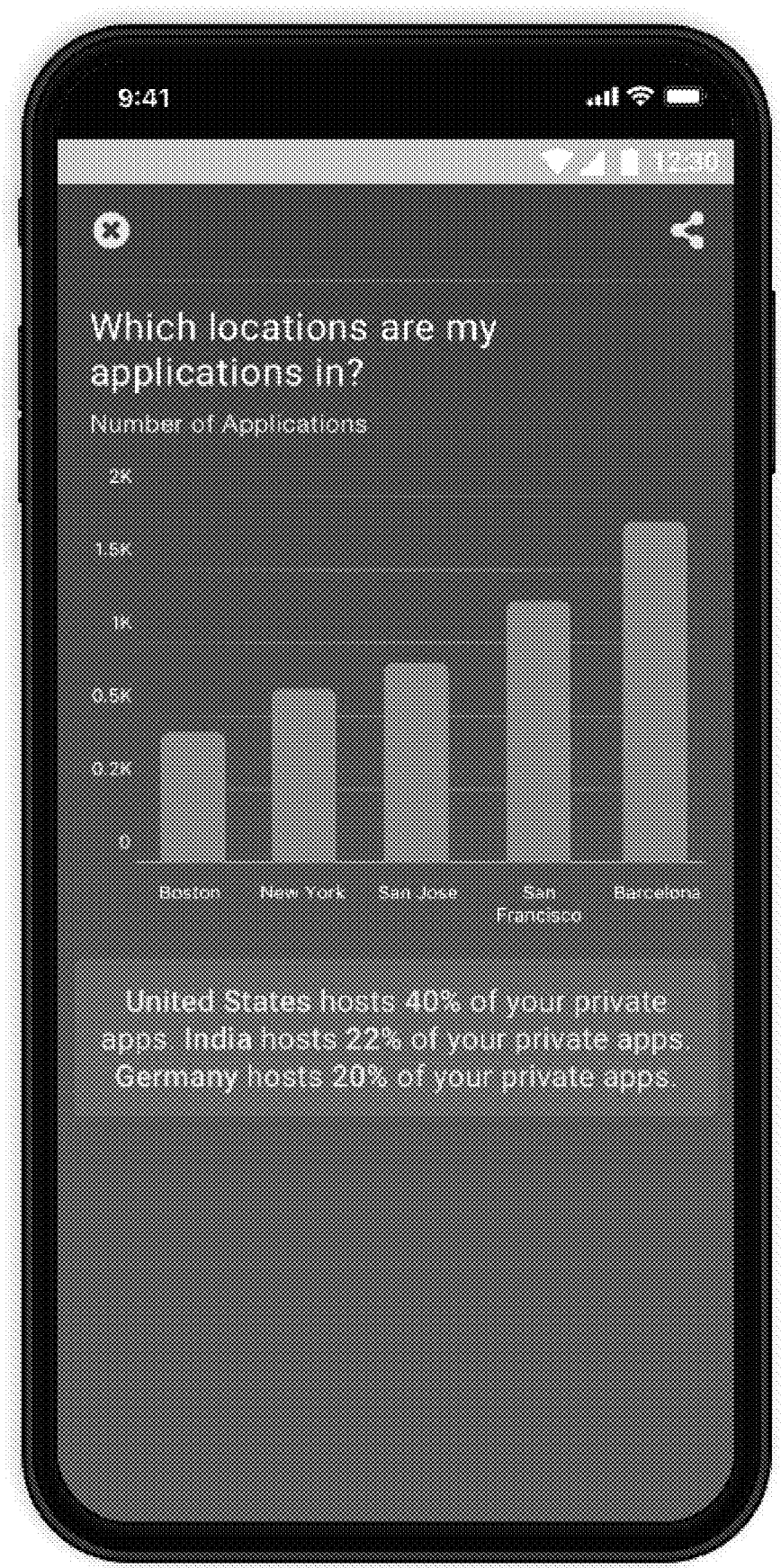
Figure 40:
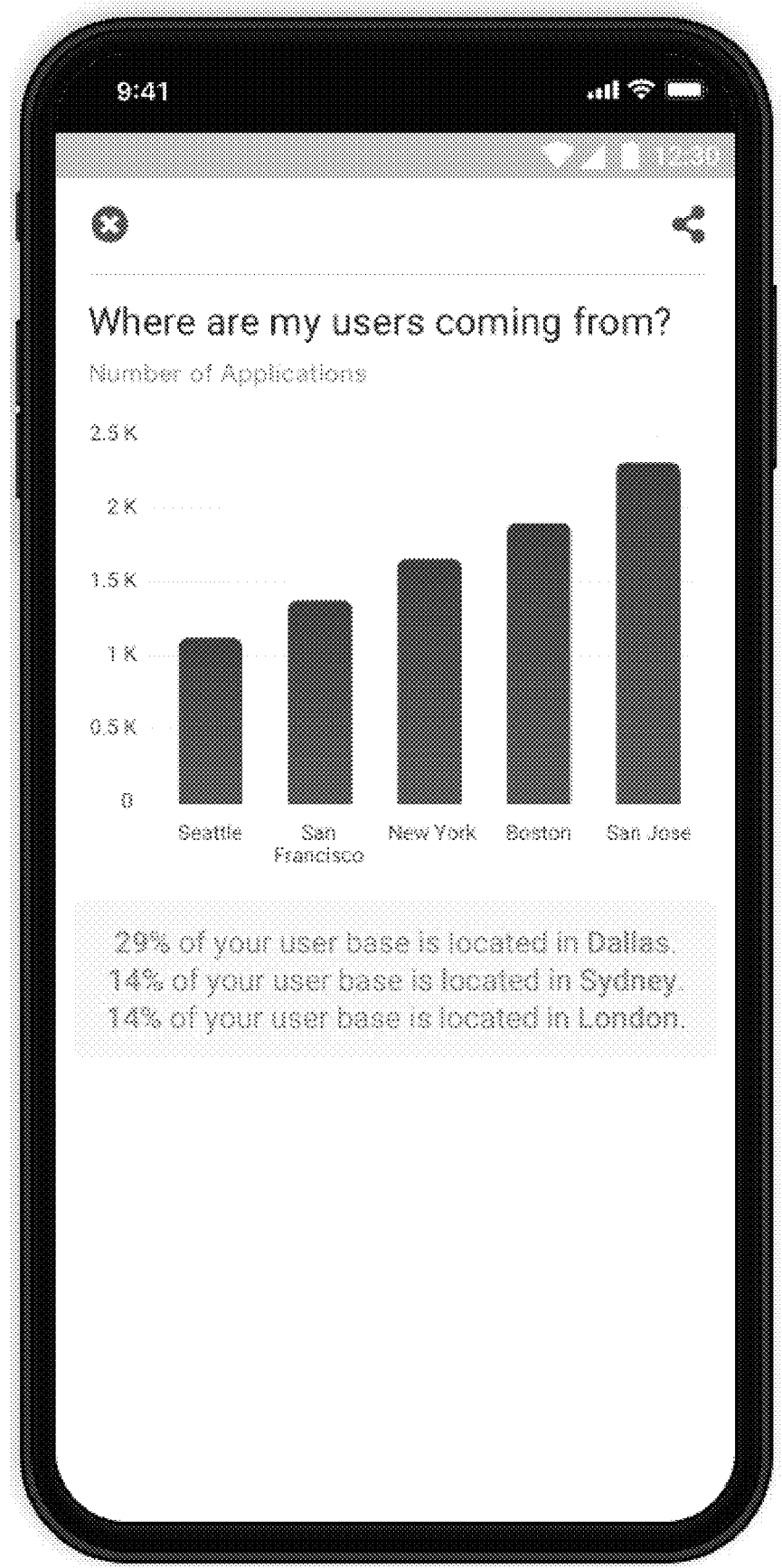
Figure 41:
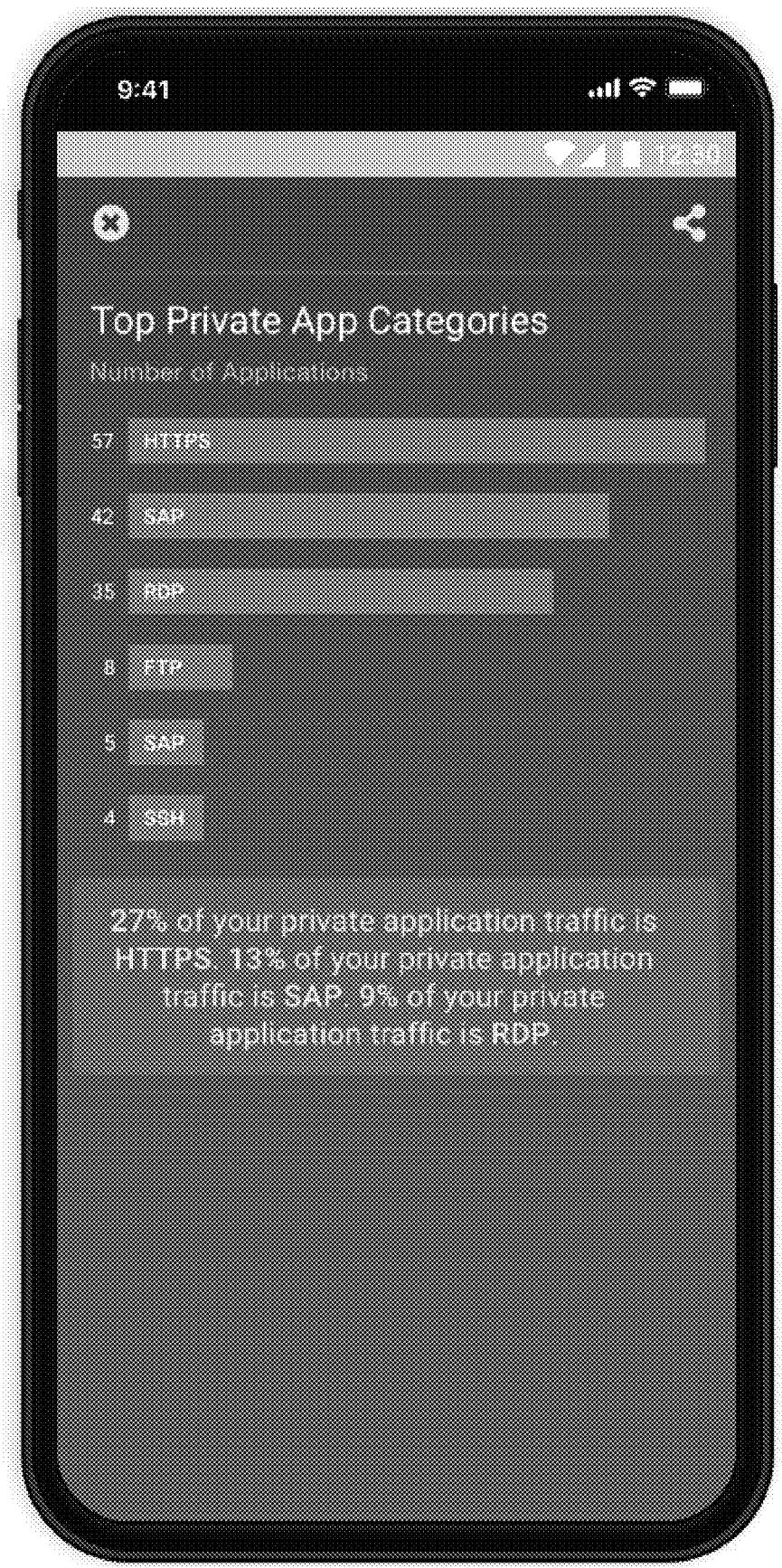
Figure 42:
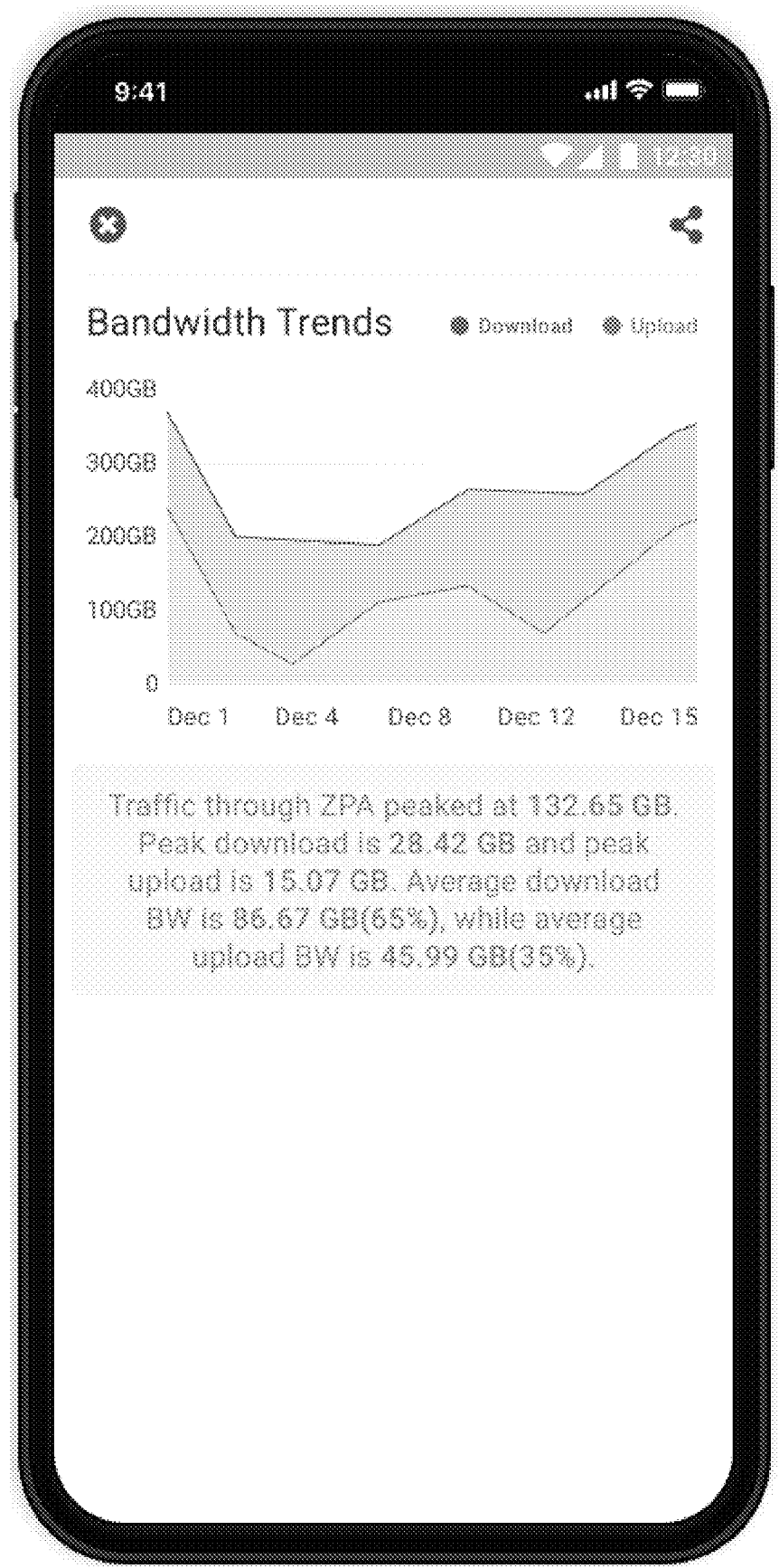
Figure 43:

In case the user 102 is also a Zscaler Private Access customer, the application 502 can show useful information from their account in this section of the application (FIG. 36). This can include where the user's private applications are hosted (private data centers vs. public clouds) (FIGS. 37-38). Then continue to Top Locations by the number of Hosted Applications (FIG. 39), as well as the Top Users by the number of Used Applications, where users are coming from (FIG. 40). The next widget represents the Top Protocols for the user's Private Applications (FIG. 41), and the final data insights are the Bandwidth Trends (download/upload) across the entire organization, for Private Applications (FIG. 42). Also, there can be visualizations of specific applications, e.g., Salesforce (FIG. 43).

News

The application 502 can present rich multimedia content in the form of news stories across the following sections: In the News, Security Updates, Product & Operation Updates, Upcoming Events, Best Practices, CxO Journeys, etc. The user 102 can browse, as well as share the stories they liked most, to stay informed and better protect their organization from up and coming security threats, as well as improve their networking/security posture by following the best practices.

Organization Summary

Figure 44:
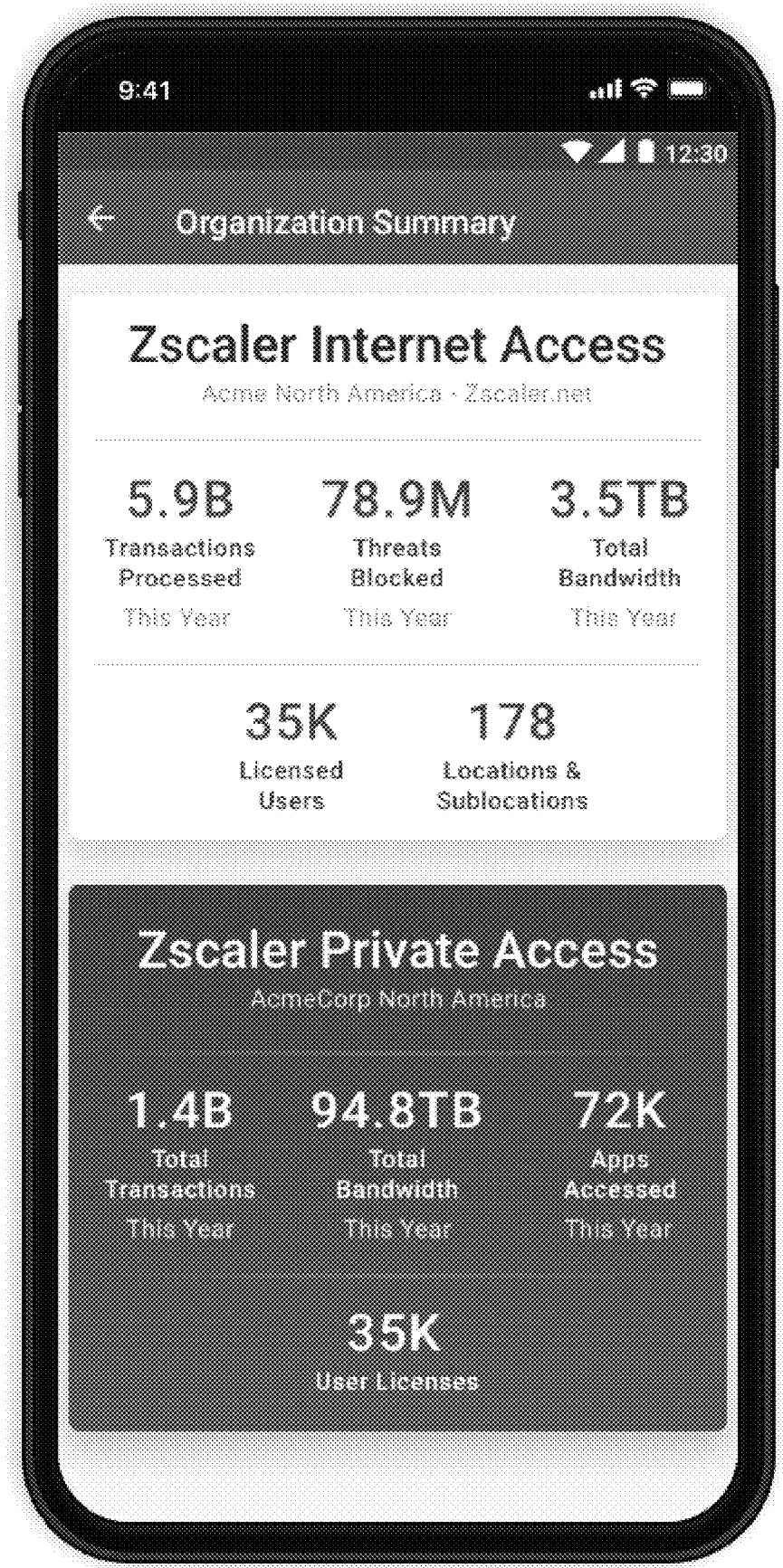
Figure 45:
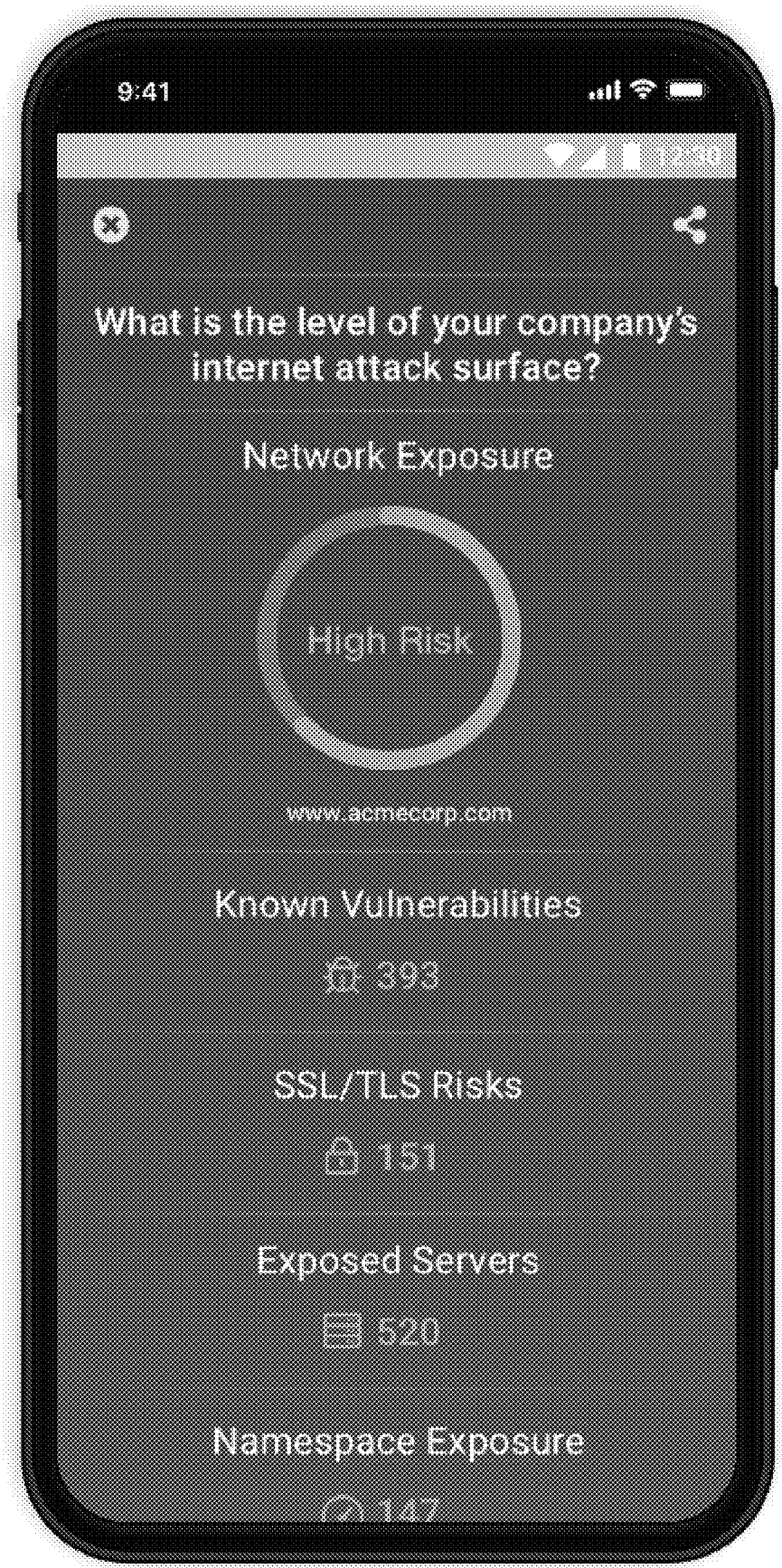

This section covers the overall usage statistics across the entire cloud-based security system 100 for a specific customer (FIG. 44). The data includes: Overall Number of Transactions, Threats Blocked, Bandwidth Used, Licensed Users, and Configured Locations & Sub-Locations. The summary can also provide risk scores, including the level of a company's Internet attack surface (FIG. 45). The risk score/posture is determined based on the Internet traffic monitored by the cloud-based security system. Most threats come from the Internet, possibly causing leaving of PII or other proprietary data. There can be other factors. The risk can be determined for every user 102, rolled up on a per-location basis, and a per-company basis. Rather than viewing raw statistics, the risk score provides a single indicator of an organization's risk.

Figure 46:
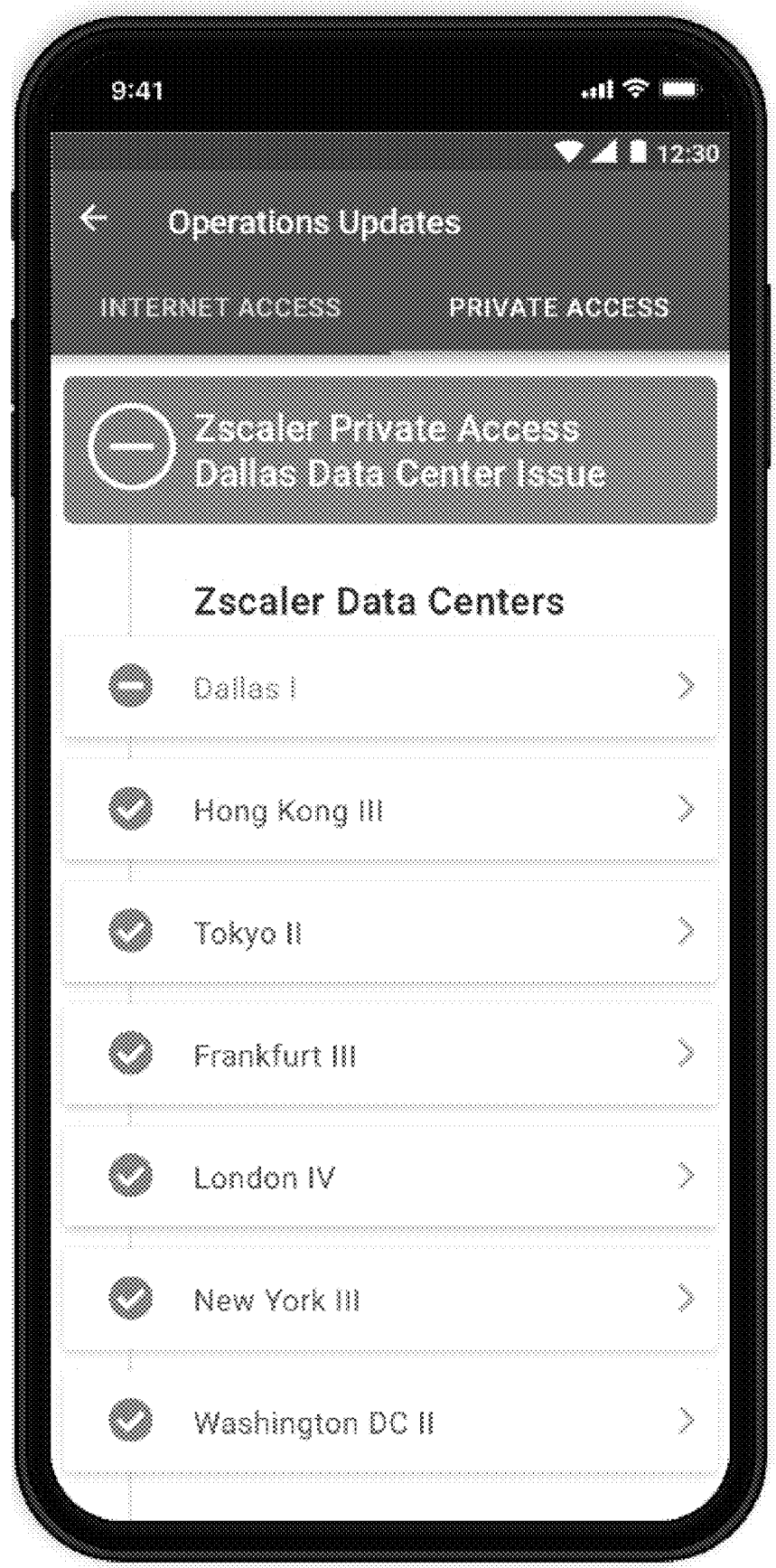
Figure 47:
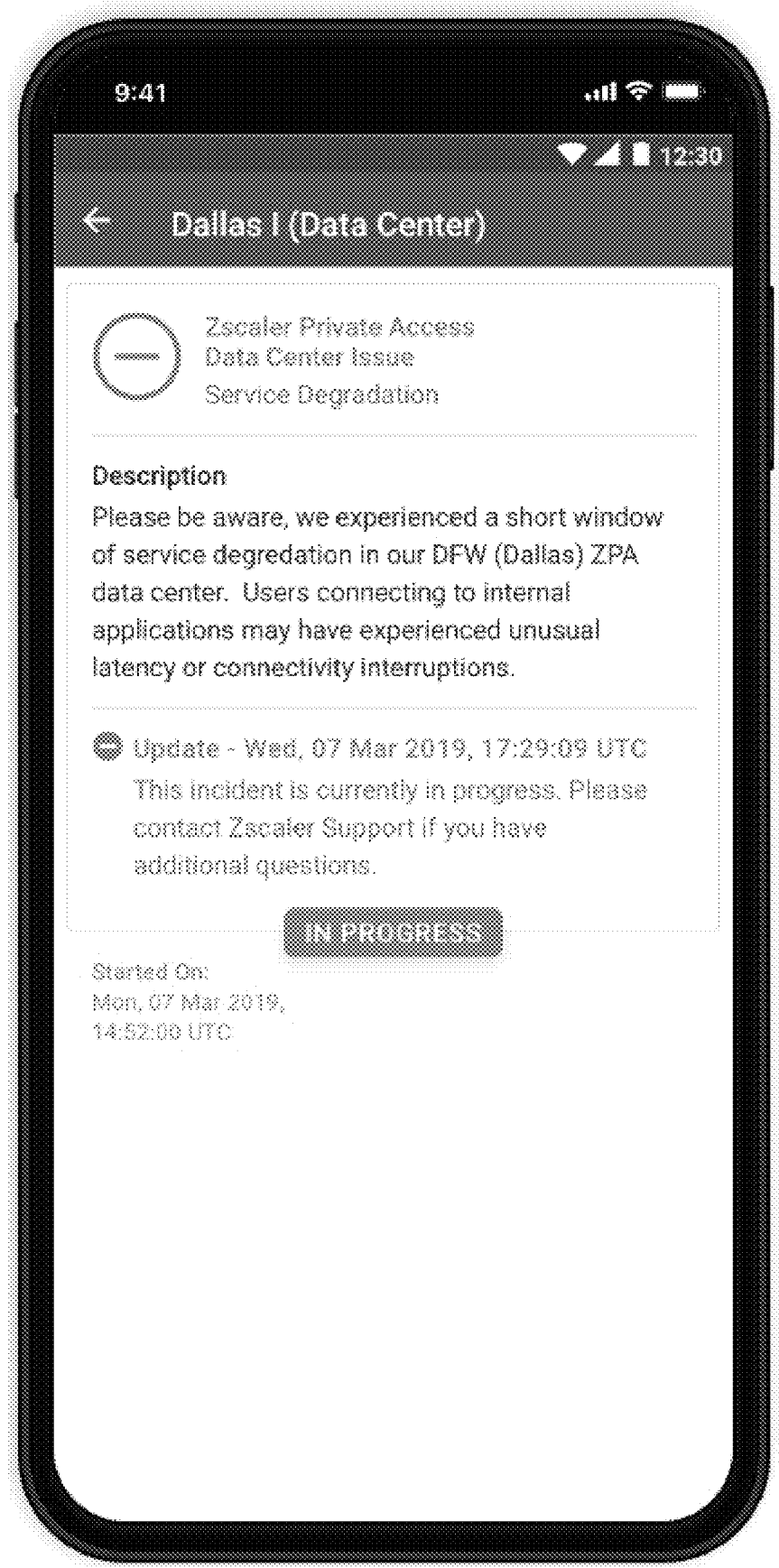
Figure 48:
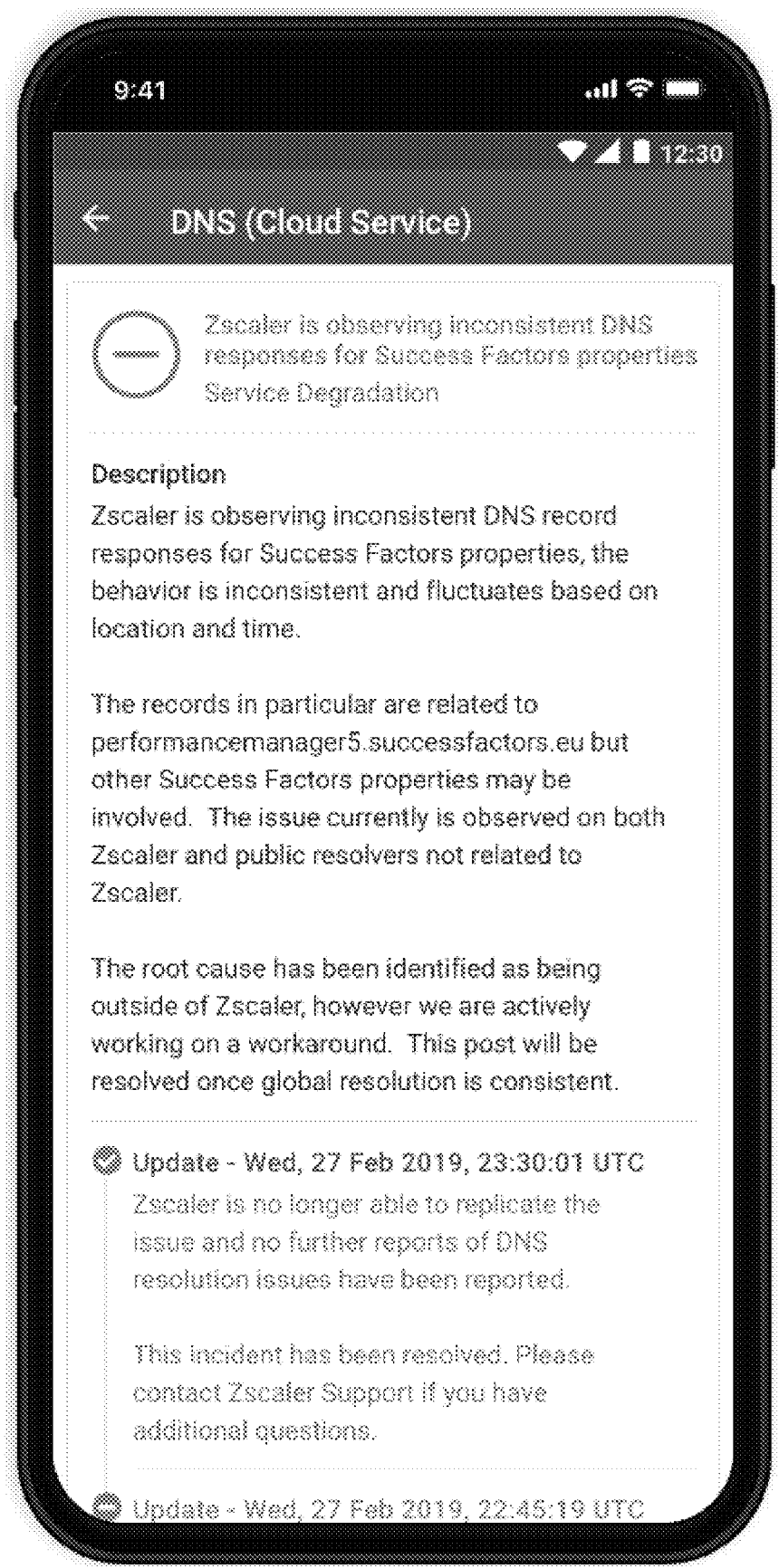
Figure 49:
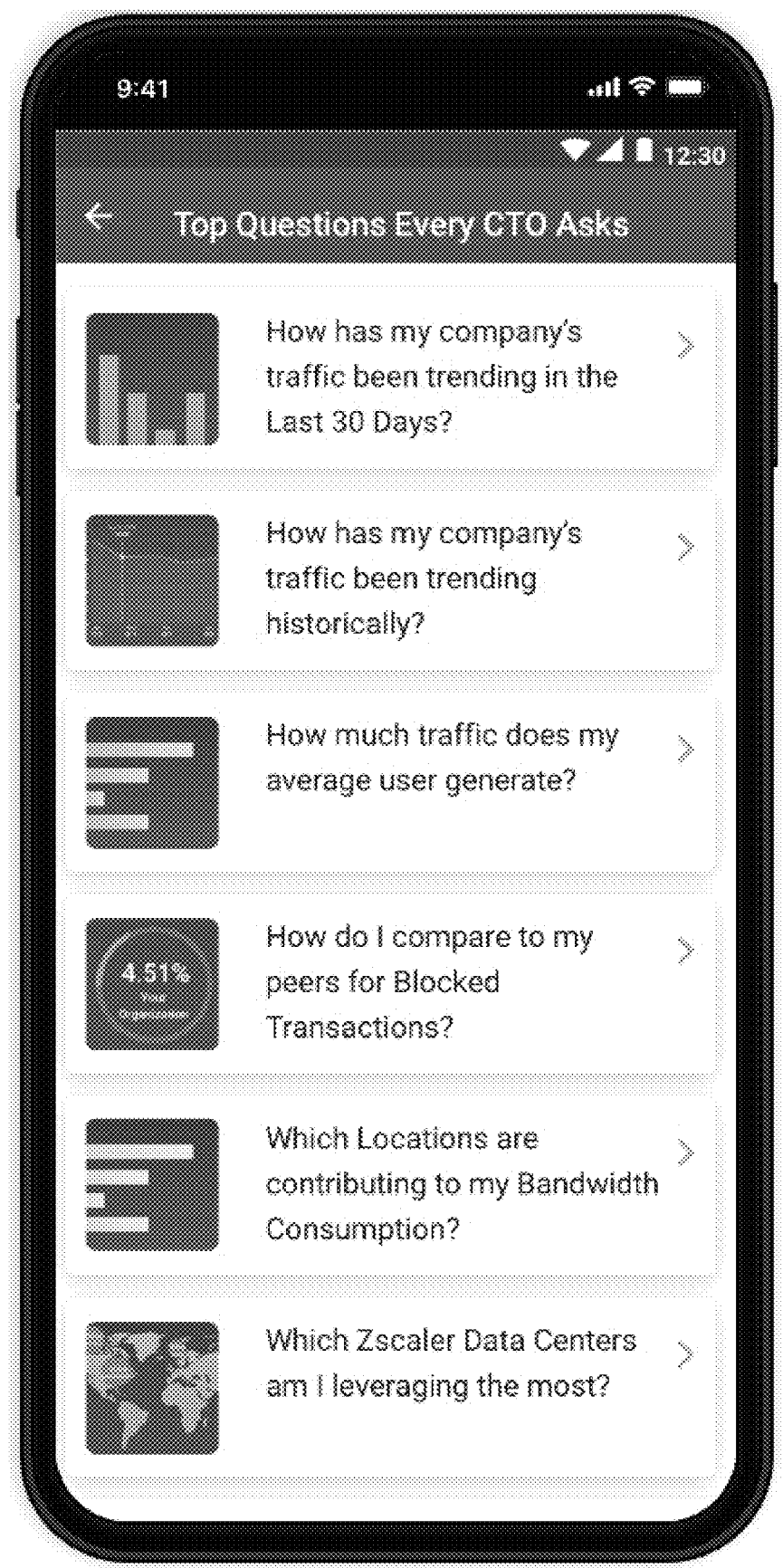

The application 502 can also provide status information related to the cloud-based security system 100 (FIGS. 46-48). Further, the application 502 can provide answers to important questions (FIG. 49).

Platform Development

The application 502 is cross-platform, working on Apple mobile devices, tablet devices, and Android devices. The application 502 is developed to support different native Application Programming Interfaces (APIs) between iOS and Android systems, and consistently rendering the UI.

The user interface needs to be high-performance to run smoothly on less powerful mobile devices. Mobile devices are generally considered less powerful than desktop machines. Applications running in mobile devices need to be lean and very efficient. As such, the back-end processing is in the cloud-based security system 100 at the monitoring application 500 with the user application 502, providing just a UI. The user application 502 provides an intuitive mobile experience. The application user interface design is intuitive, meaning that users 102 are supposed to understand and use our application immediately—without consciously thinking about how to use it. The challenge is that with smaller screens and much less space, layouts and components must be very well designed.

To resolve the challenge of cross-platform, the user application 502 uses React Native as the tool library. React Native combines the best parts of native application development tools with the best JavaScript language ecosystem: React. Mobile applications built by React Native can run across platforms. To resolve the challenge of high-performance applications, Expo is used to bundle, manage release control, and update the application. To resolve the challenge of the intuitive mobile experience, the user application 502 has a look and feel that would be close to native on both iOS, iPadOS, and Android. Most users 102 are used to the card metaphor (Apple's App Store application on iOS 13.0 is a well-known example that uses this design pattern). The application complies with Apple's Human Interface Guidelines (HIG) and Android's Material Design guidelines and best practices.

Mobile Application Notification System

The present disclosure describes various processes for monitoring and displaying security posture and risk. This includes providing real-time notifications about significant changes across traffic, security and company risk score, as well as the latest security industry news. Again, the monitoring application 500 provides insights on network security, vulnerability, and threats found in the company network. Users get notified on important network events seen in company networks and key security updates. Once the user receives a notification, the user can be redirected to the section that had been significantly impacted in one of the areas that are currently supported (traffic, security, company risk score) or to one of the latest news stories. Also, the user would be able to share the discovered data with their coworkers directly from the mobile application. Of note, this notification behavior and patterns is consistent across all the supported platforms (iOS, iPadOS, Android).

The present disclosure includes a mobile application notification system that works across platforms, e.g., working on Apple devices, Android devices, etc. The challenge is that iOS and Android systems have different messaging systems, different native APIs, and different support for programming languages. It is a challenge to build an application that runs on both platforms and renders the ser interface in a consistent way. Complicated messaging system. iOS messaging publishing subscribing system, and Android platform messaging publishing subscribing system are all complicated to set up, use, and test. The challenge is how to set up, taking advantage of, and maintaining two sets of messaging systems with the monitoring application 500.

The application user interface design should be intuitive, meaning that users are supposed to understand and use the monitoring application 500 immediately—without consciously thinking about how to use it. The challenge is that with smaller screens and much less space, layouts, and components must be very well designed.

Figure 50:
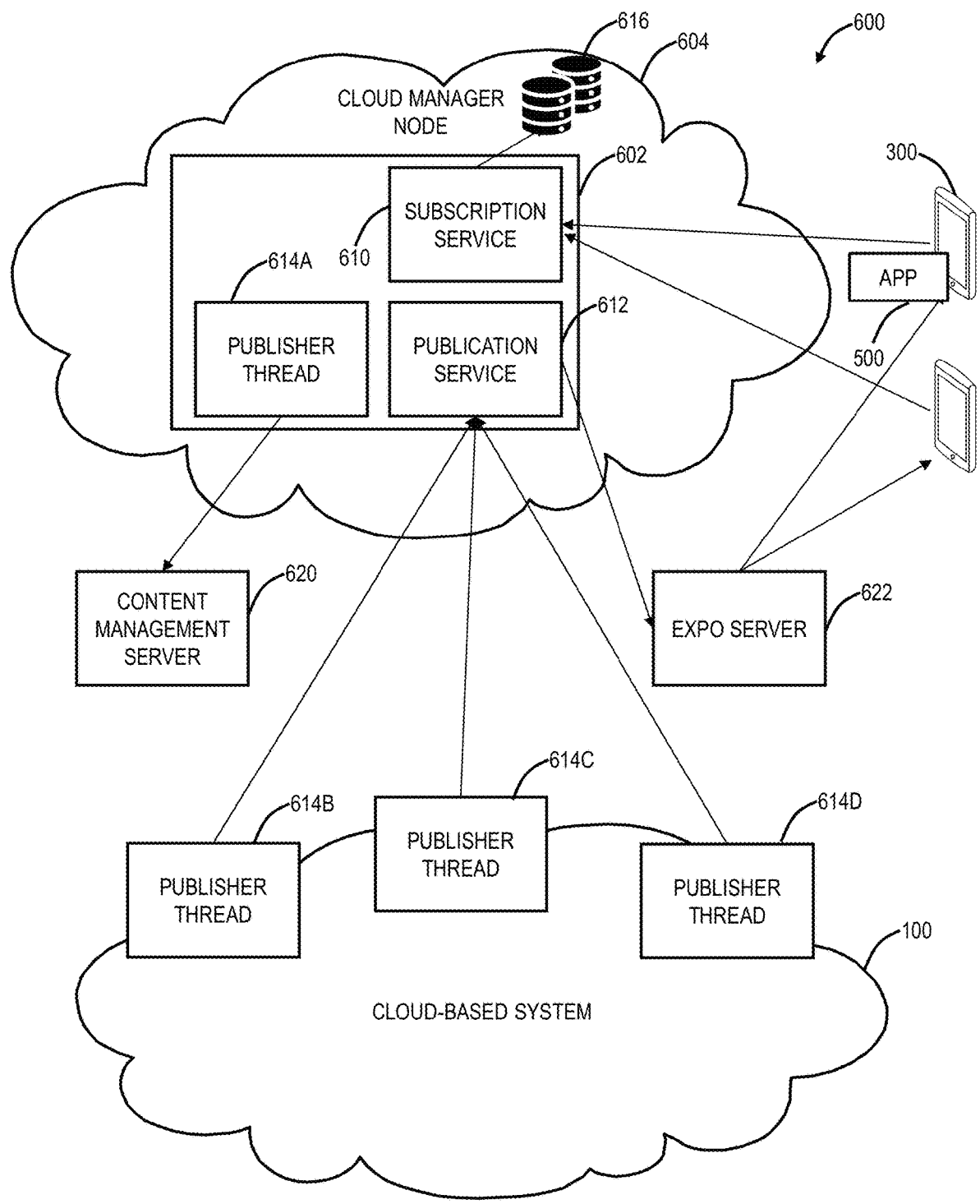
FIG. 50 is a block diagram of a network with a mobile application notification system for implementing a cross-platform monitoring application.

FIG. 50 is a block diagram of a network 600 with a mobile application notification system 602 for implementing a cross-platform monitoring application 500. The mobile application notification system 602 and the monitoring application 500 utilize React Native to resolve the challenges of cross-platform compatibility. React Native combines the best parts of native application development tool with the best JavaScript language ecosystem, namely React. The monitoring application 500 built in React Native can run across platforms. To resolve the challenge of a complicated messaging system. the mobile application notification system 602 has at least two sets of environments to set up and maintain the system, e.g., for iOS and Android. For iOS, the mobile application notification system 602 follows guidance from Apple. For Android, the mobile application notification system 602 employs a system of Firebase to set up and maintain the system.

The mobile application notification system 602 is configured to interact with the cloud-based system 100 and to perform the various processes described herein with respect to the monitoring application 500. Again, as described herein, the monitoring application 500 can instantaneously distribute important security, network and operational information to CXO executives and security administrators connected through various devices 300 like mobile phones, tablets, etc. in a cloud agnostic multi-tenant platform, e.g., the cloud-based system 100. The mobile application notification system 602 provides secure delivery of information include news articles and organization specific alerts based on traffic usage and security threats. The mobile application notification system 602 provides a scalable platform to deliver the information to any devices or social media.

The mobile application notification system 602 is configured to deliver messages to the monitoring application 500 on the user devices 300. For example, the delivery of the messages to the mobile client can fall under two categories approved news articles and organization centric data metric fluctuations information. The mobile application notification system 602 provides secure delivery, granular notifications, is scalable, and support high performance.

The mobile application notification system 602 can be referred to as a Cloud Agnostic Notification Platform (CANP) that provides configurable subscription and publication services for delivering network security alerts and articles. In an embodiment, the mobile application notification system 602 operates on a cloud manager node 604. The cloud manager node 604 can be part of the cloud-based system 100 or it can be communicatively coupled to the cloud-based system 100. For example, the cloud manager node 604 can be part of the system 124.

The CANP can include a subscription service 610, a publication service 612, and multiple publisher threads 614 (labeled as 614A-614D). The subscription service 610 is provided for supporting users 102, via the user devices 300 with the monitoring applications 500, where the users 102 are each part a multi-tenant environment deployed in various clouds, including the cloud-based system 100. The subscription service 610 can connect to a database 616 that stores user information. The subscription service 610 is configured to enroll and configure the information exchanged between the mobile application notification system 602 and the monitoring applications 500 for associated users 102.

The publication service 612 is configured to deliver messages to the monitoring applications 500. That is, the publication service 612 can deliver significant changes in network traffic, security and company risk score to the monitoring applications 500 on cross-platform mobile devices 300 such as iOS or Android. The publisher threads 614 are each associated with a specific cloud, cloud service, or type of messages. For example, the publisher thread 614A can connected to a content management server 620 for news updates, such as network security news and insights.

The publisher threads 614B, 614C, 614D can be part of the cloud-based system 100 or another cloud system. In an embodiment, the publisher thread 614B is configured to provide updates related to an Internet Access cloud service that provides cloud-based security. The publisher 614C is configured to provide updates related to a ZTNA cloud service. The publisher 614D is configured to provide updates related to a user experience monitoring cloud service. Of course, other embodiments are also contemplated.

The publisher threads 614 are configured to provide the data to the publication service 612. The publication service 612 is configured to provide delivery of global messages and articles d through a centralized dispatching scheduler and delivery of cloud specific messages is supported through distributed dispatching schedulers in each cloud.

The publication service 612 can be configured to deliver messages to the monitoring applications 500 via an Expo server 622 as well as via mobile operating specific notification systems. For example, iOS includes an Apple Push Notification Service (APNS) and Android can use Firebase Cloud Messaging (FCM).

Figure 51:
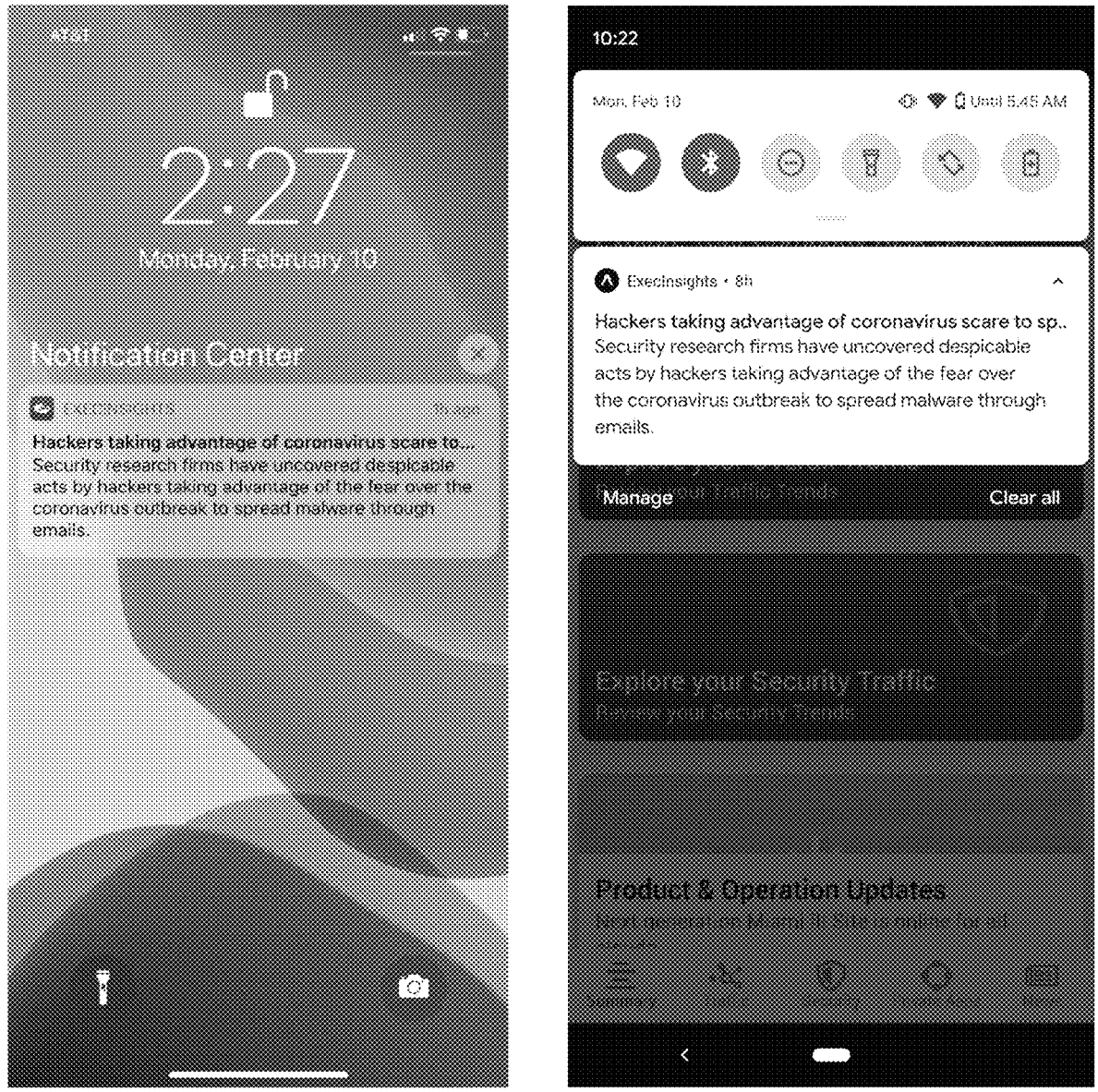
FIG. 51 is an example screenshot of a push notification to the monitoring application 500 in different platforms, namely iOS and Android.

FIG. 51 is an example screenshot of a push notification to the monitoring application 500 in different platforms, namely iOS and Android.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A mobile application notification system comprising:
a cloud node including a subscription service and a publication service, each executed on the cloud node, wherein the subscription service is configured to manage a plurality of users associated with a tenant of multiple tenants, each of the plurality of users have a corresponding user device that executes a monitoring application thereon, wherein management via the subscription service includes subscribing each of the plurality of users and configuring the tenant and associated messages, and wherein the publication service is configured to communicate with the corresponding user device of the plurality of users and to communication to a plurality of publisher threads, for exchanging messages therebetween, based on the subscribing and the configuring, and wherein the publication service communicates to the corresponding user device of the plurality of users via any of a React server and a push notification service, and wherein at least two corresponding user device of the plurality of users utilize a different operating system and platform from one another.

2. The mobile application notification system of claim 1, wherein the monitoring application utilizes React Native.

3. The mobile application notification system of claim 1, wherein the plurality of publisher threads are each associated with a different cloud service.

4. The mobile application notification system of claim 1, wherein the plurality of publisher threads including at least four publisher threads supporting content management for news and insight, updates related to an Internet Access cloud service that provides cloud-based security, configured to provide updates related to a Zero Trust Network Access (ZTNA) cloud service, and updates related to a user experience monitoring cloud service.

5. The mobile application notification system of claim 1, wherein a publisher thread of the plurality of publisher threads is configured to obtain log data from a storage cluster associated with a cloud-based system, wherein the log data includes transaction data associated with the plurality of user, wherein the transaction data is for one or more of cloud security service transactions, application access via a Zero Trust Network Access (ZTNA) service, and user experience metrics, and wherein the cloud-based security system includes the multiple tenants with the plurality of users each assigned thereto, and analyze the log data to determine a plurality of visualizations of the transaction data for a tenant.

6. The mobile application notification system of claim 5, wherein the plurality of visualizations are provided in a tile format to the mobile application.

7. The mobile application notification system of claim 5, wherein the publisher thread is further configured to analyze the log data to determine insights associated with the transaction data for the plurality of users across the plurality of tenants; and provide the insights as part of the plurality of visualizations.

8. The mobile application notification system of claim 5, wherein the plurality of visualizations include a summary of a risk score over time and activities contributing to the risk score.

9. The mobile application notification system of claim 5, wherein the plurality of visualizations include a graph of traffic trends including encrypted and unencrypted traffic.

10. The mobile application notification system of claim 5, wherein the plurality of visualizations include a graph bandwidth by locations of the tenant.

11. The mobile application notification system of claim 5, wherein the plurality of visualizations include a graph of cloud application usage and a chart of top applications for the tenant.

12. The mobile application notification system of claim 5, wherein the plurality of visualizations include a graph of usage based on social applications, Office 365 applications, streaming applications, file sharing applications, collaboration applications, and productivity applications.

13. The mobile application notification system of claim 12, wherein the applications further include graphs of different applications therein.

14. The mobile application notification system of claim 5, wherein the plurality of visualizations include, for the cloud security service transactions, a list of transaction processed, threats blocked, total bandwidth, number of users, and number of locations.

15. The mobile application notification system of claim 5, wherein the plurality of visualizations include a chart of threat distribution.

16. The mobile application notification system of claim 5, wherein the plurality of visualizations include a chart of malicious content trends, phishing trends, botnets, sandboxed threats blocked, advanced threats blocked, browser exploits, and Cross-Site Scripting.

17. The mobile application notification system of claim 5, wherein the plurality of visualizations include, for the ZTNA service, a visualization of application usage, locations, and bandwidth trends.

18. The mobile application notification system of claim 5, wherein the plurality of visualizations include data related to an operational status of the cloud-based security system.

19. A method comprising:

executing a subscription service and a publication service on a cloud node, managing, via the subscription service, a plurality of users associated with a tenant of multiple tenants, each of the plurality of users have a corresponding user device that executes a monitoring application thereon, wherein the managing includes subscribing each of the plurality of users and configuring the tenant and associated messages; and communicating, via the publication service, with the corresponding user device of the plurality of users and communicating, via the publication service, to a plurality of publisher threads, for exchanging messages therebetween, based on the subscribing and the configuring, and wherein the publication service communicates to the corresponding user device of the plurality of users via any of a React server and a push notification service, wherein at least two corresponding user device of the plurality of users utilize a different operating system and platform from one another.

20. A non-transitory computer-readable storage medium having computer-readable code stored thereon for programming a node to perform steps of:

executing a subscription service and a publication service on a cloud node, managing, via the subscription service, a plurality of users associated with a tenant of multiple tenants, each of the plurality of users have a corresponding user device that executes a monitoring application thereon, wherein the managing includes subscribing each of the plurality of users and configuring the tenant and associated messages; and communicating, via the publication service, with the corresponding user device of the plurality of users and communicating, via the publication service, to a plurality of publisher threads, for exchanging messages therebetween, based on the subscribing and the configuring, and wherein the publication service communicates to the corresponding user device of the plurality of users via any of a React server and a push notification service, wherein at least two corresponding user device of the plurality of users utilize a different operating system and platform from one another.

\* \* \* \* \*